United States Patent
Cushman

(10) Patent No.: US 11,894,591 B2
(45) Date of Patent: Feb. 6, 2024

(54) ELECTROCHEMICAL CELLS

(71) Applicant: IFBattery Inc., West Lafayette, IN (US)

(72) Inventor: John H. Cushman, West Lafayette, IN (US)

(73) Assignee: IFBattery Inc., West Lafayette, IN (US)

( * ) Notice: Subject to any disclaimer, the term of this patent is extended or adjusted under 35 U.S.C. 154(b) by 0 days.

(21) Appl. No.: 17/887,590

(22) Filed: Aug. 15, 2022

(65) Prior Publication Data

US 2023/0076928 A1 Mar. 9, 2023

Related U.S. Application Data

(63) Continuation of application No. 16/437,248, filed on Jun. 11, 2019, now abandoned, which is a continuation-in-part of application No. PCT/US2018/021981, filed on Mar. 12, 2018.

(60) Provisional application No. 62/470,772, filed on Mar. 13, 2017, provisional application No. 62/479,548, filed on Mar. 31, 2017, provisional application No. 62/506,422, filed on May 15, 2017, provisional
(Continued)

(51) Int. Cl.
*H01M 8/18* (2006.01)
*H01M 8/083* (2016.01)

(52) U.S. Cl.
CPC ........... *H01M 8/188* (2013.01); *H01M 8/083* (2013.01); *H01M 2300/0014* (2013.01)

(58) Field of Classification Search
CPC ... H01M 12/00–04; H01M 12/08–085; H01M 8/06; H01M 8/0662; H01M 8/08–083; H01M 8/18–188
See application file for complete search history.

(56) References Cited

U.S. PATENT DOCUMENTS 1,771,190 A * 7/1930 Polcich ................ H01M 12/04
429/188
2,921,111 A 1/1960 Crowley et al.
(Continued)

FOREIGN PATENT DOCUMENTS

| CH | 245180 A | 10/1946 |
|---|---|---|
| CN | 103262336 A | 8/2013 |

(Continued)

OTHER PUBLICATIONS

Sequin, "Instantly rechargeable battery could change the future of electric and hybrid automobiles," at www.purdue.edu (Jun. 1, 2017).

(Continued)

*Primary Examiner* — Jonathan Crepeau
*Assistant Examiner* — Jacob Buchanan
(74) *Attorney, Agent, or Firm* — Sonapat LLC

(57) ABSTRACT

Electrochemical cells and batteries that can operate with a single electrolyte solution, such as those comprising an anode, a cathode current collector, and a porous, non-conductive spacer between the cathode current collector and anode. Membraneless electrochemical cells and batteries are also disclosed. The electrochemical cells and batteries disclosed herein may be used, for example, to produce electricity or to generate hydrogen or both, and to deliver electricity or hydrogen or both to process applications.

18 Claims, 11 Drawing Sheets

Related U.S. Application Data application No. 62/518,523, filed on Jun. 12, 2017, provisional application No. 62/530,687, filed on Jul. 10, 2017, provisional application No. 62/531,274, filed on Jul. 11, 2017, provisional application No. 62/595,171, filed on Dec. 6, 2017, provisional application No. 62/684,135, filed on Jun. 12, 2018.

(56) References Cited

U.S. PATENT DOCUMENTS

| | | | |
|---|---|---|---|
| 3,156,586 A | 11/1964 | Solomon et al. | |
| 3,378,408 A * | 4/1968 | Hamlen | H01M 6/04 |
| | | | 429/220 |
| 3,607,066 A | 9/1971 | Basch et al. | |
| 4,037,025 A * | 7/1977 | Dey | H01M 8/22 |
| | | | 429/402 |
| 4,355,085 A | 10/1982 | Goebel | |
| 4,358,291 A | 11/1982 | Cuomo et al. | |
| 4,499,734 A | 2/1985 | Zaromb | |
| 4,517,736 A | 5/1985 | Goebel | |
| 4,650,732 A | 3/1987 | Weber | |
| 4,687,717 A | 8/1987 | Kaun et al. | |
| 4,745,204 A | 5/1988 | Cuomo et al. | |
| 4,931,368 A | 6/1990 | Ayers et al. | |
| 4,950,560 A | 8/1990 | Tarcy | |
| 4,988,585 A | 1/1991 | O'Hara et al. | |
| 5,254,415 A | 10/1993 | Williams et al. | |
| 5,286,473 A * | 2/1994 | Hasebe | C01F 7/42 |
| | | | 423/657 |
| 5,508,131 A | 4/1996 | Bowen et al. | |
| 5,718,986 A | 2/1998 | Brenner | |
| 5,964,309 A | 10/1999 | Kimura et al. | |
| 6,506,360 B1 * | 1/2003 | Andersen | C01F 7/428 |
| | | | 423/657 |
| 7,255,960 B1 | 8/2007 | Dow et al. | |
| 7,576,254 B2 | 8/2009 | Block et al. | |
| 8,080,233 B2 | 12/2011 | Woodall et al. | |
| 8,202,641 B2 | 6/2012 | Winter et al. | |
| 8,418,435 B2 | 4/2013 | Hatoum | |
| 8,450,001 B2 | 5/2013 | Kell et al. | |
| 8,841,014 B1 | 9/2014 | Deshpande et al. | |
| 9,580,310 B1 | 2/2017 | Woodall et al. | |
| 9,731,967 B1 | 8/2017 | Woodall et al. | |
| 9,780,398 B1 | 10/2017 | Woodall et al. | |
| 10,665,868 B2 | 5/2020 | Cushman et al. | |
| 2001/0028979 A1 * | 10/2001 | Takami | H01M 6/045 |
| | | | 429/245 |
| 2002/0110733 A1 | 8/2002 | Johnson | |
| 2003/0042872 A1 | 3/2003 | Larson | |
| 2008/0056986 A1 | 3/2008 | Woodall et al. | |
| 2009/0159582 A1 | 6/2009 | Chami et al. | |
| 2010/0003545 A1 | 1/2010 | Horne et al. | |
| 2011/0091776 A1 | 4/2011 | Rubino et al. | |
| 2011/0311846 A1 | 12/2011 | Whitacre | |
| 2012/0052001 A1 | 3/2012 | Woodall et al. | |
| 2012/0308867 A1 | 12/2012 | Winter | |
| 2013/0089769 A1 | 4/2013 | Proctor et al. | |
| 2013/0195729 A1 | 8/2013 | Woodall et al. | |
| 2013/0302710 A1 | 11/2013 | Boersma et al. | |
| 2013/0309554 A1 | 11/2013 | Dhar et al. | |
| 2013/0323565 A1 | 12/2013 | Tucholski | |
| 2014/0093804 A1 | 4/2014 | Kreiner et al. | |
| 2014/0272483 A1 | 9/2014 | Pham et al. | |
| 2015/0086843 A1 | 3/2015 | Whitacre | |
| 2015/0118583 A1 * | 4/2015 | Arbel | H01M 10/4242 |
| | | | 429/404 |
| 2015/0364789 A1 | 12/2015 | Ogawa et al. | |
| 2016/0032464 A1 | 2/2016 | Balakiryan et al. | |
| 2016/0285130 A1 | 9/2016 | Meng et al. | |
| 2019/0296383 A1 | 9/2019 | Cushman | |
| 2020/0189911 A1 | 6/2020 | Koehler et al. | |
| 2021/0013531 A1 | 1/2021 | Cushman et al. | |
| 2022/0042183 A1 | 2/2022 | Cushman et al. | |

FOREIGN PATENT DOCUMENTS

| | | | | |
|---|---|---|---|---|
| CN | 106159302 A | 11/2016 | | |
| CN | 106469821 A | 3/2017 | | |
| CN | 110551921 A | 12/2019 | | |
| GB | 1204830 | 9/1970 | | |
| GB | 1355166 | 6/1974 | | |
| GB | 1579747 A | * 11/1980 | ............ | H01M 12/04 |
| JP | S51-099228 | 9/1976 | | |
| WO | WO2012033692 A2 | 3/2012 | | |
| WO | WO2017106215 A1 | 6/2017 | | |
| WO | WO2020056003 A2 | 3/2020 | | |
| WO | WO2021/168238 A1 | 8/2021 | | |
| WO | WO2022/031900 A1 | 2/2022 | | |
| WO | WO2022/076672 A1 | 4/2022 | | |

OTHER PUBLICATIONS

International Search Report for international patent application PCT/2018/021981, dated Jul. 24, 2018.

Written Opinion of the International Searching Authority for international patent application PCT/2018/021981, dated Jul. 24, 2018.

Purdue University Research Foundation News, "Refillable technology could provide enough energy to drive an electric car up to 3,000 miles," at https://www.purdue.edu/newsroom/releases/2019/Q1/refillable-technology-could-provide-enough-energy-to-drive-an-electric-car-up-to-3,000-miles.html (Feb. 7, 2019) (7 pages) with transcript of video (3 pages).

Machine Translation of CH245180A (4 pages).

Machine Translation of CN106159302A (10 pages).

Macdonald et al., "Evaluation of Alloy Anodes for Aluminum-Air Batteries: Corrosion Studies," Corrosion Science, vol. 4, pp. 652-657 (1988).

Additional Machine Translation of CN106159302A (9 pages).

Machine translation of claims and description of CN110551921A (8 pages).

Hydrogen Storage, U.S. Department of Energy Fuel Cell Technologies Office (2017) (2 pages).

Gallucci, "Hydrogen-On-Tap Device Turns Trucks Into Fuel-Efficient Vehicles," IEEE Spectrum (May 2020) (4 pages).

Xu et al., "Instant hydrogen production using Ga—In—Sn—Bi alloy-activated AI-water reaction for hydrogen fuel cells," Journal of Renewable and Sustainable Energy (2020) (21 pages).

Zhang et al., "The performance of a soluble lead-acid flow battery and its comparison to a static lead-acid battery," Energy Conversion and Management, vol. 52, pp. 3391-3398 (2011).

Rahman et al., "Evaluation of additive formulations to inhibit precipitation of positive electrolyte in vanadium battery," Journal of Power Sources, vol. 340, pp. 139-149 (2017).

Pradhan et al., "Substrate materials and novel designs for bipolar lead-acid batteries: A review," Journal of Energy Storage, vol. 32, 101764 (2020) (22 pages).

Kim et al., "Development of carbon composite biploar plate (BP) for vanadium redox flow battery (VRFB)," Composite Structures, vol. 109, pp. 253-259 (2014).

Gambe et al., "Development of Biploar All-solid-state Lithium Battery Based on Quasi-solid-state Electrolyte Containing Tetraglyme-LiTFSA Equimolar Complex," Scientific Reports, pp. 1-4 (2015).

FMC, "Persulfates Techical Information," (2001) (16 pages).

U.S. Appl. No. 17/275,218, filed Mar. 11, 2021 (72 pages).

Machine Translation of CN106469821.

Machine Translation of JPS51-099228.

"Brine," Britannica Online Encyclopedia, https://www.britannica.com/science/brine, printed Sep. 8, 2022 (2 pages).

"NASA Salinity, Salinity Explained," https://salinity.oceansciences.org/science-salinity.htm, printed Sep. 8, 2022 (2 pages).

"Metalary, Iridium Price," www.metalary.com, Sep. 19, 2022 (1 page).

"Metalary, Palladium Price," www.metalary.com, Sep. 19, 2022 (1 page).

"Metalary, Silver Price," www.metalary.com, Sep. 19, 2022 (1 page).

(56) References Cited

OTHER PUBLICATIONS

U.S. PTO Office Action dated Aug. 31, 2022, for U.S. Appl. No. 17/275,218 (14 pages).
USGS, "Why is the ocean salty," printed from www.usgs.gov/faqs on Oct. 23, 2022 (1 page).
Second Machine Translation of Description of CH245180A (2 pages).
Online German-to-English translations from www.deepl.com/translator, printed on Jul. 1, 2023 (2 pages).
Crawford, "Application of Alkaline Activated Persulfate and Evaluation of Treatment Residuals," Remediation of Chlorinated and Recalcitrant Compounds, The Eighth International Conference, Monterey, California, May 21-24 (2012) (25 pages).
Evonik, "Persulfates Technical Information," printed from Persulfates Brochure at https://active-oxygens.evonik.com/en/products-and-services/persulfates (Jun. 23) (18 pages).
Furman et al., "Mechanism of Base Activation of Persulfate," Environ. Sci. Technol., vol. 44, pp. 6423-6428 (2010).
PeroxyChem, Environmental Solutions, Klozur® Persulfate Activation Guide, "Alkaline Activated Klozur Persulfate" at https://active-oxygens.evonik.com/en/media/application-guides/attachment/138126?rev=9cae1e3df28eb8e2bd72179255af9269 (printed Oct. 20, 2023) (5 pages).
Li et al., "Activation of Persulfate for Groundwater Remediation: From Bench Studies to Application," Appl. Sci., vol. 13, 1304 (2023) (20 pages).
Lister, "Decomposition of Sodium Hypochlorite: The Uncatalyzed Reaction," Can. J. Chem., vol. 34, pp. 465-478 (1956).
McAninch, "The Stability of Chlorine Bleach Solutions," at https://www.birkocorp.com/resources/blog/the-stability-of-chlorine-bleach-solutions/ (Oct. 14, 2013) (2 pages).
Pradhan, "Evaluation of pH and Chlorine Content of a Novel Herbal Sodium Hypochlorite for Root Canal Disinfection: An Experimental In vitro Study," Contemporary Clinical Dentistry, 9:S74-8 (2018).
Zhao, "Effect and mechanism of persulfate activated by different methods for PAHs removal in soil," Journal of Hazardous Materials, 254-255, pp. 228-235 (2013).
Office Action dated May 9, 2023, in U.S. Appl. No. 17/275,218 (12 pages).

\* cited by examiner

ELECTROCHEMICAL CELLS

CROSS-REFERENCE TO RELATED APPLICATIONS

This application is a continuation of U.S. application Ser. No. 16/437,248, filed on Jun. 11, 2019, the entire contents of which are specifically incorporated by reference herein. U.S. application Ser. No. 16/437,248 is a continuation-in-part of international application no. PCT/US2018/021981, filed on Mar. 12, 2018, which claims priority to, and benefit of, U.S. Provisional Application No. 62/470,772, filed on Mar. 13, 2017; U.S. Provisional Application No. 62/479,548, filed on Mar. 31, 2017; U.S. Provisional Application No. 62/506,422, filed on May 15, 2017; U.S. Provisional Application No. 62/518,523, filed on Jun. 12, 2017; U.S. Provisional Application No. 62/530,687, filed on Jul. 10, 2017; U.S. Provisional Application No. 62/531,274, filed on Jul. 11, 2017; and U.S. Provisional Application No. 62/595,171, filed on Dec. 6, 2017.

U.S. application Ser. No. 16/437,248 also claims benefit of U.S. Provisional Application No. 62/684,135, filed on Jun. 12, 2018.

BACKGROUND

The U.S. Energy Information Agency projects a 48% increase in world energy consumption by 2041 and global industries are rapidly adapting to these new opportunities. At the center of their efforts is the demand for a new battery that is more efficient, more environmentally friendly, more affordable and more convenient. The Department of Defense has stated a goal of generating 25% of its energy from renewable sources by the year 2025. Additionally, the military must have readily available sources of hydrogen when fielding stealthy fuel-cell powered vehicles.

Liquid batteries, whether flow or no-flow, are known in the art and work on the same principles as solid batteries, except the electrolyte is liquid. Such batteries are comprised of electrochemical cells which are based on reduction-oxidation chemistry. Oxidation occurs on the anode side of the cell and reduction on the cathode side. The solvents used in electrochemical cells are varied. In many circumstances, aqueous solutions are used on both sides of an electrochemical cell with each side (cathode side and anode side) in contact with an electrode (i.e., the cathode and anode respectively). The electrodes of the two-half cells are placed in electrical contact to allow for current to flow. To maintain charge balance, an electrochemical cell must also allow for the passage of ions. In some batteries, this is done with a salt bridge separating the cathode solution from the anode solution. The bridge prevents mixing of the two solutions. The prior art teaches that if the solutions were to mix, the half-cells could be destroyed by direct chemical reaction.

Some electrochemical cells deploy membranes or salt bridges to prevent shorting and to separate multiple electrolyte solutions. Such membranes are costly and readily degrade over time. WO2017/106215 reports electrochemical cells which may be used in the absence of membranes and which use two or more immiscible electrolytes.

The present disclosure includes improved designs for electrochemical cells and batteries (including flow cells and flow batteries) that, in certain embodiments, include a single electrolyte solution, an anode, a cathode current collector, and a porous, non-conductive spacer between the cathode current collector and anode. In contrast to typical flow batteries, the anode and cathode current collector in such embodiments need not be immersed in an electrolyte. Additional embodiments include improved designs for membraneless electrochemical cells and batteries that comprise multiple electrolytes.

SUMMARY

Embodiments of the disclosure include electrochemical cells and batteries that can operate with a single electrolyte solution. In one such embodiment, an electrochemical cell comprising an anode, a cathode current collector and a porous, non-conductive spacer between the anode and the cathode current collector is provided. Additional designs for electrochemical cells and batteries that can operate with a single electrolyte solution are also provided.

In a further embodiment of the disclosure, an electrochemical battery comprising one or more of these electrochemical cells and further comprising a load is provided.

In yet a further embodiment of the disclosure, methods of delivering electricity to applications with these electrochemical cells or electrochemical batteries of the disclosure or both are provided.

In additional embodiments of the disclosure, methods of delivering hydrogen to applications with these electrochemical cells or electrochemical batteries of the disclosure or both are provided.

Additional embodiments include vehicles powered by electrochemical cells of the disclosure.

Further embodiments include certain membraneless electrochemical cells that contain separate first and second electrolyte solutions at the cathode and anode, respectively; batteries comprising these electrochemical cells; methods of delivering hydrogen, electricity or both with the cells and batteries to applications; capacitors; and various methods related to these embodiments.

More embodiments and features are included in the detailed description that follows, and will be readily apparent to those skilled in the art from the description or recognized by practicing the embodiments as described in the description, including in the figures and claims.

BREIF DESCRIPTION OF THE DRAWINGS

The accompanying figures constitute a part of this disclosure. The figures serve to provide a further understanding of certain exemplary embodiments. The disclosure and claims are not limited to embodiments illustrated in the figures.

DETAILED DESCRIPTION

Figure 1:
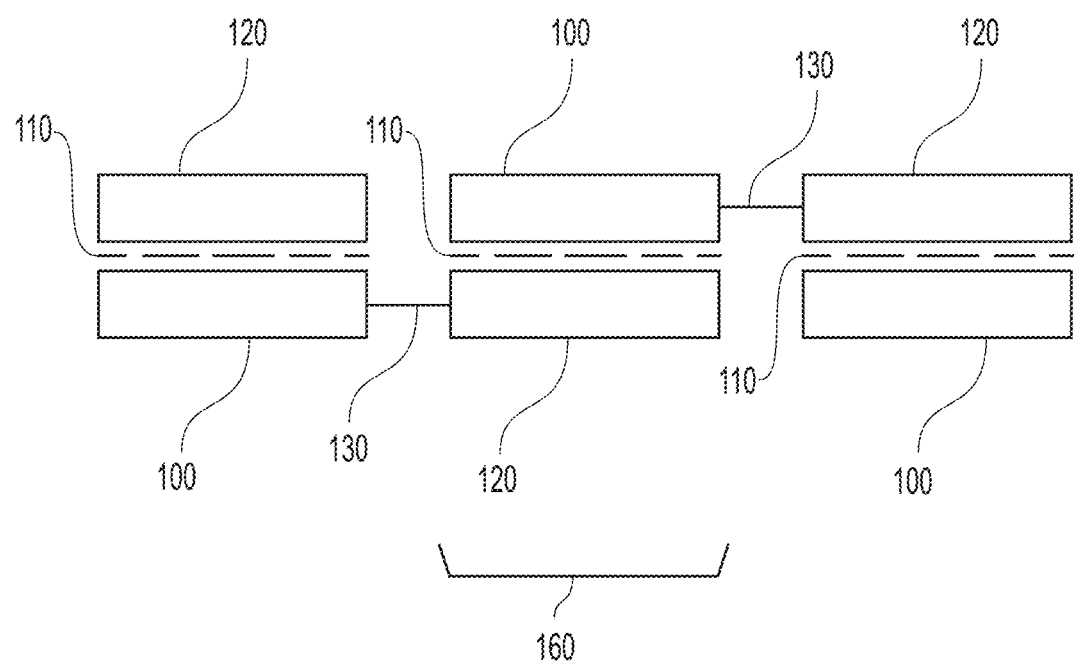
FIG. 1 is a schematic of one embodiment of electrochemical cells of the disclosure.

Various embodiments will now be explained in greater detail. It is to be understood that both the foregoing general description and the following detailed description are exemplary and explanatory only, and are not restrictive of this disclosure or of the claims. Any discussion of certain embodiments or features, including those depicted in the figures, serve to illustrate certain exemplary aspects of the disclosure. The disclosure and claims are not limited to the embodiments specifically discussed herein or illustrated in the figures.

Embodiments of the disclosure include electrochemical cells and batteries that can operate with a single electrolyte solution. Such cells and batteries do not require multiple electrolyte solutions separated by a membrane, by a salt bridge or by other techniques. In one such embodiment, an electrochemical cell comprising an anode, a cathode current collector and a porous, non-conductive spacer between the anode and the cathode current collector is provided.

The electrochemical cells of the disclosure, including this embodiment and other embodiments of electrochemical cells described herein, may be used to form batteries to supply electricity, hydrogen, or both to applications. Electrical applications include, for example, grid applications such as cell phone tower backup power or backup power for wind farms or solar farms. The electricity could also be used to power vehicles, household appliances, consumer goods or toys. When configured to run to produce hydrogen, the hydrogen may be delivered to an application such as a fuel cell for electricity production or a vehicle or to, for example, an engine or furnace for burning. The electrochemical cells may be configured such that electricity is primarily delivered, hydrogen is primarily delivered, or both are delivered in various ratios. In some embodiments, the cells and batteries of the disclosure run in flow mode in that electrolyte is added to the cell or battery and then removed after use, thereby replenishing the supply of electrolyte to the cell or battery. When run in hydrogen mode, electricity mode, or combination of hydrogen and electricity, the batteries of the disclosure may be configured to power a number of different devices such as electric vehicles and other electric devices. Examples of such vehicles include scooters, motorized grocery cars, battery backups, forklifts, trucks, passenger cars, lift trucks, motorcycles, fork trucks, planes, boats, quads, tractors and other industrial and agricultural vehicles. The hydrogen from the batteries of the disclosure can be delivered to a fuel cell which generates electricity for a motor for vehicle transport. The electricity from the batteries of the disclosure may be used to power the fuel cell controller and/or power other vehicle electronics such as an electric motor.

In an example electrochemical cell of the disclosure, the anode is in physical contact with the porous, non-conductive spacer, such as non-conductive screen, which in turn is in physical contact with the cathode current collector such as carbon foam. In other embodiments, the spacer is not in physical contact with the anode, the cathode current collector, or both, but is instead positioned at a distance from the anode, cathode current collector, or both.

The purpose of the porous, non-conductive spacer is to prevent physical contact of the cathode current collector with the anode. The term "non-conductive" with reference to the porous spacer means that the spacer is not electrically conductive. The spacer is porous to electrolyte, and is also porous in a non-selective manner to anions and cations in the electrolyte solution. Being electrically non-conductive, the porous spacer does not permit the passage of electrons through it. Non-conductive materials include those that are classified as electrical insulators. Thus, any electrical insulator can be used as a spacer. These features of the spacer differentiate it from salt bridges and membranes in conventional batteries, which are often used to maintain separation of multiple electrolyte solutions. Many different types of non-conductive porous materials can be used for the spacer, such as an organic polymer, surgical tape, fiberglass film, glass wool, wood, paper, cloth, cardboard, and nylon. One such organic polymer is vinyl coated polyester. The thickness of the spacer is often between about 0.1 mm and about 0.8 mm.

A microporous material, such as surgical tape, may be used to wrap the electrochemical cell so as to help maintain its physical integrity. The wrapping need not completely encase the electrochemical cell.

Cathode current collectors and anodes in electrochemical cells in this disclosure, including in this embodiment and other embodiments of electrochemical cells described herein, may be selected from suitable materials. Examples of suitable cathode current collector materials include steel, carbon such as in the graphite allotrope of carbon, carbon impregnated with a metal, and carbon foam. Conducting carbon cloth (which is also referred to as carbon foam), for example, is a suitable cathode current collector for many embodiments and is a conducting material. Suitable anodes for embodiments having a single electrolyte solution include metals in Column 13 of the Periodic Table and their alloys. These metals and alloys include, for example, aluminum, gallium, indium and thallium, as well as alloys comprising at least one of these. One example alloy has the name of Galinstan, which is an alloy of gallium, indium and tin.

In many embodiments, the electrochemical cell further comprises a single electrolyte solution. The term "single electrolyte solution" refers to one common electrolyte solution shared between the anode and cathode current collector of the cell, as opposed to multiple physically separated electrolyte solutions. This contrasts with conventional liquid batteries, which require at least two electrolyte solutions, i.e., an electrolyte solution for each of the half cells. The single electrolyte solution may comprise any appropriate number of components as described herein, including multiple components that could be considered electrolytes.

The electrochemical cell may be saturated with respect to the electrolyte. In some embodiments, the cell is not immersed in an electrolyte bath. By saturating via drip, spray or atomization of the electrolyte, for example, one can activate the cells to produce electricity or hydrogen or both. One example of a cathode current collector is carbon foam. The electrolyte may be sprayed onto the cell until or before the carbon foam is saturated in such an example. As electricity or hydrogen or both is produced, additional electrolyte (or other materials such as salts, oxidants, or bases) may be sprayed or otherwise delivered to the cell to maintain its saturation and replace salts and oxides. Indeed, a recirculator could be used to continuously recycle and deliver electrolyte or other materials to the cell. Thus, it is not necessary to keep a large supply of electrolyte present, which saves on both cost and weight compared with flow cells of the prior art.

In these and other embodiments, the anode of the electrochemical cell is made from aluminum, for example. In many embodiments the aluminum is in the form of a sheet. In many other embodiments it is in the form of a screen or other thin porous structure. The thickness of the aluminum screen may be, for example between about 0.05 mm and about 0.5 mm, or between about 0.1 mm and about 0.3 mm. In some embodiments, the cathode current collector can be carbon foam and the porous, non-conductive spacer can be a non-conductive screen such as an organic polymer or surgical tape. One such polymer is vinyl coated polyester.

Additional embodiments include 1) an electrochemical cell comprising an anode, a cathode current collector, a porous, non-conductive spacer between the anode and the cathode current collector, and a single electrolyte solution; 2) an electrochemical cell consisting essentially of an anode, a cathode current collector, a porous, non-conductive spacer between the anode and the cathode current collector, and a single electrolyte solution; and 3) an electrochemical cell consisting of an anode, a cathode current collector, a porous, non-conductive spacer between the anode and the cathode current collector, and a single electrolyte solution.

Electrochemical cells are often connected to one another by metal conductors to form electrochemical batteries. An example of a metal conductor is copper such as copper wire or wires. Thus, for example, an aluminum anode on one electrochemical cell is in contact with a porous, non-conductive spacer on the cell and the spacer is in turn in contact with a carbon foam current collector. The aluminum anode is also in contact with a metal conductor to the cathode current collector on an adjacent electrochemical cell, which in turn is in contact with its own porous, non-conductive spacer and corresponding aluminum anode. In this manner, a series of electrochemical cells may be connected. At the termination of the series, the terminal electrochemical cells may be connected to a load, such as an application or to additional electrochemical cell series so that the overall electrochemical battery has both a series and parallel arrangement of electrochemical cells.

In some embodiments, the electrochemical cells are also configured to operate as flow cells. The cells may be configured as flow cells so as to support a flow battery, for example. In such a battery, electrolyte can be provided to cells during the operation of the battery continuously during operation so that electrical charging is not required.

In many embodiments of the disclosure, the electrolyte comprises water and one or more salts. Examples of solvents for use in the electrolyte, including water and others, may be found in Table 1.

TABLE 1

| Polar Solvents | |
| --- | --- |
| Solvent | Dielectric constant |
| Water | 80 |
| Sulfuric acid | 101 |
| Ammonia | 26.7 |
| Ethanol | 24.3 |
| Acetonitrile | 36.2 |
| Pyridine | 12.3 |
| Methanol | 30 |
| Glycerol | 47 |
| Ethylene glycol | 37 |
| Hydrofluoric acid | 134 |
| Furfural | 42 |
| Hydrazine | 52 |
| Formamide | 84 |

TABLE 1-continued

| Polar Solvents | |
| --- | --- |
| Solvent | Dielectric constant |
| Hydrogen peroxide | 128 |
| Hydrocyanic acid | 158 |

In many embodiments, there are two salts that are added to the electrolyte. Examples of such salts include salts of peroxydisulfate (such as sodium peroxydisulfate), hypochlorite, and sulfate (such as sodium sulfate). The electrolyte may additionally comprise a base, such as sodium hydroxide. One of the salts is an oxidant. Thus, in many embodiments, the electrolyte contains an oxidant and also contains an additional salt, such as a metal salt found in Table 3, wherein the anion portion of the metal salt and the oxidant differ.

The non-limiting list of compounds in Table 2, or their corresponding salts and acids as the case may be, may be delivered and dissociate to form oxidants. As used herein, the term "oxidant" refers to the compound added to perform oxidation as well as the resulting anion that results from dissociation of that compound. Thus, peroxydisulfuric acid ($H_2S_2O_8$), sodium peroxydisulfate ($Na_2S_2O_8$) and the peroxydisulfate anion ($S_2O_8^{2-}$) are all oxidants as used herein. When the acid or salt form of the peroxydisulfate oxidant, for example, is added to an electrolyte of the disclosure, there will be dissociation into the anion form. The anion form is the form which acts to oxidize another species and which in turn is reduced.

TABLE 2

| Oxidants |
| --- |
| Hydrogen peroxide |
| Nitric acid |
| Sulfuric acid |
| Peroxydisulfuric acid |
| Sodium peroxydisulfate |
| Peroxymonosulfuric acid |
| Chlorite, chlorate, perchlorate, and other analogous halogen compounds |
| Hypochlorite and other hypohalite compounds, including NaClO |
| Hexavalent chromium compounds such as chromic and dichromic acids and chromium trioxide, pyridinium chlorochromate (PCC), and chromate/dichromate compounds |
| Permanganate compounds such as potassium permanganate |
| Sodium perborate |
| Nitrous oxide |
| Potassium nitrate |
| Sodium bismuthate |
| Oxygen |
| Ozone |
| Halogens |

The other salt may be, for example, any one of the compounds found in Table 3.

TABLE 3

Metal Salts

| | | | | | | | |
|---|---|---|---|---|---|---|---|
| KI | NaI | LiI | BaI$_2$ | CaI$_2$ | MgI$_2$ | ZnI$_2$ | AlI$_3$ |
| KBr | NaBr | LiBr | BaBr$_2$ | CaBr$_2$ | MgBr$_2$ | ZnBr$_2$ | AlBr$_3$ |
| KCl | NaCl | LiCl | BaCl$_2$ | CaCl$_2$ | MgCl$_2$ | ZnCl$_2$ | AlCl$_3$ |
| K$_2$SO$_4$ | Na$_2$SO$_4$ | Li$_2$SO$_4$ | BaSO$_4$ | CaSO$_4$ | MgSO$_4$ | ZnSO$_4$ | Al$_2$(SO$_4$)$_3$ |
| KNO$_3$ | NaNO$_3$ | LiNO$_3$ | Ba(NO$_3$)$_2$ | Ca(NO$_3$)$_2$ | Mg(NO$_3$)$_2$ | Zn(NO$_3$)$_2$ | Al(NO$_3$)$_3$ |
| KF | NaF | LiF | BaF$_2$ | CaF$_2$ | MgF$_2$ | ZnF$_2$ | AlF$_3$ |
| K$_3$PO$_4$ | Na$_3$PO$_4$ | Li$_3$PO$_4$ | Ba$_3$(PO$_4$)$_2$ | Ca$_3$(PO$_4$)$_3$ | Mg$_3$(PO$_4$)$_2$ | Zn$_3$(PO$_4$)$_2$ | AlPO$_4$ |
| K$_2$SO$_3$ | Na$_2$SO$_3$ | Li$_2$SO$_3$ | BaSO$_3$ | CaSO$_3$ | MgSO$_3$ | ZnSO$_3$ | Al$_2$(SO$_3$)$_3$ |
| K$_2$CO$_3$ | Na$_2$CO$_3$ | Li$_2$CO$_3$ | BaCO$_3$ | CaCO$_3$ | MgCO$_3$ | ZnCO$_3$ | Al$_2$(CO$_3$)$_3$ |
| K$_2$S | Na$_2$S | Li$_2$S | BaS | CaS | MgS | ZnS | Al$_2$S$_3$ |
| K$_2$SiO$_3$ | Na$_2$SiO$_3$ | Li$_2$SiO$_3$ | BaSiO$_3$ | CaSiO$_3$ | MgSiO$_3$ | ZnSiO$_3$ | Al$_2$(SiO$_3$)$_3$ |
| KOH | NaOH | LiOH | Ba(OH)$_2$ | Ca(OH)$_2$ | Mg(OH)$_2$ | Zn(OH)$_2$ | Al(OH)$_3$ |

The second salt should be a compound that dissociates so as to produce a metal ion. An example of such a metal salt is sodium sulfate.

In many embodiments, the electrolyte further contains a base such as a strong base. Examples of strong bases include LiOH, RbOH, CsOH, Sr(OH)$_2$, Ba(OH)$_2$, NaOH, KOH, Ca(OH)$_2$, or a combination thereof. One particular example is NaOH.

In further embodiments, the electrolyte comprises one of water or an alcohol. The electrolyte can be a catholyte, for example. When an oxidant and a metal salt are present in this electrolyte, the two can have different anion components. An example oxidant includes sodium peroxydisulfate and an example metal salt is sodium sulfate. This electrolyte may further comprise a base, such as sodium hydroxide.

A further embodiment includes an electrochemical cell comprising:
 a. an anode;
 b. a cathode current collector; and
 c. a porous, non-conductive spacer between the cathode current collector and anode;
wherein the electrochemical cell does not comprise an electrolyte.

The anode, cathode current collector, and spacer may have one or more characteristics or features described above for those components. Such an embodiment may, for example, be constructed in one location then transported to another location where it is contacted with electrolyte (such as a single electrolyte solution) for use.

Cells that do not comprise an electrolyte solution may be contacted with electrolyte solution such that they do then comprise an electrolyte solution. Those skilled in the art understand that the cells are to be contacted with the electrolyte solution in order to generate electricity or hydrogen.

The disclosure includes additional embodiments of electrochemical cells that can operate with a single electrolyte solution. For example, an electrochemical cell comprising a single aqueous electrolyte solution in contact with a non-metallic cathode current collector, an oxidant, and a metal solid wherein current travels from the metal solid to the cathode current collector via a load, is provided.

In such a cell, the electrolyte solution can be basic and the oxidant can be $S_2O_8^{2-}$, for example. The electrolyte solution may further comprise, for instance, sodium hydroxide. Suitable metal solids include those in Column 13 of the Periodic Table and their alloys. These metals and alloys include, for example, aluminum, gallium, indium and thallium, as well as alloys comprising at least one of these. One example metal solid is aluminum, such as aluminum in the form of a foil. The cell may further comprise a porous stabilizer. In one example, the cell may comprise a metal sulfate (such as Na$_2$SO$_4$) where the cathode current collector is carbon foam and the porous stabilizer is glass wool or a borosilicate or both. The pH of the cell may, for example, be greater than 12, greater than 13 or greater than 14.

Cells such as this, which can use a single electrolyte solution, may produce, for example, between about 10 Watt-hours/(kg of electrolyte+anode metal) and about 680 Watt-hours/(kg of electrolyte+anode metal). When measured per kg of electrolyte, the cell may produce, for example, between about 10 Watt-hours/kg of electrolyte and about 100 Watt-hours/kg of electrolyte, between about 40 Watt-hours/kg of electrolyte and about 80 Watt-hours/kg of electrolyte, or between about 10 Watt-hours/kg of electrolyte and about 60 Watt-hours/kg of electrolyte. The power produced per square centimeter of metal solid can be, for example, between about 600 mW and about 1000 mW. As with other electrochemical cells in this disclosure, the cell may be configured to operate in flow mode. The cell may include an inflow stream that comprises, for example, an aqueous electrolyte solution that may further comprise an oxidant such as sodium peroxydisulfate or a solution comprising peroxydisulfate anion or both. Oxidant (such as solid Na$_2$S$_2$O$_8$ or Na$_2$S$_2$O$_8$ in solution) can be provided to the cell, for example, Na$_2$S$_2$O$_8$ in an aqueous basic solution, where the base may be, for example, sodium hydroxide. The cell may further comprise an outflow stream. The outflow stream may comprise an aqueous solution and may also include, for example, metal sulfate.

A further embodiment includes a method of creating a capacitor comprising the step of disconnecting the load from one side of an electrochemical cell of the disclosure that can operate using a single electrolyte solution. The method further comprises the step of reconnecting the load. A further embodiment includes a capacitor, prepared by the process of alternatively disconnecting and reconnecting the load from at least one of the cathode current collector or anode in the electrochemical cell.

An additional embodiment that can operate with a single electrolyte solution is an electrochemical cell comprising a single aqueous electrolyte solution in contact with a non-metallic cathode current collector, an oxidant, and a metal solid wherein current travels from the metal solid to the cathode current collector via a load, and wherein the pH is greater or equal to 12. As an example, the non-metallic cathode current collector can be carbon foam, the oxidant can be a peroxydisulfate salt, and the metal solid can be aluminum.

An additional embodiment that can operate with a single electrolyte solution is an electrochemical cell comprising a single aqueous electrolyte solution in contact with a non-metallic cathode current collector, an oxidant, and one or more anodes wherein current travels from the one or more anodes to the cathode current collector via a load, and wherein the pH is greater or equal to 10.

Suitable anodes include metals in Column 13 of the Periodic Table and their alloys. These metals and alloys include, for example, aluminum, gallium, indium and thallium, as well as alloys comprising at least one of these. One example metal is aluminum, such as aluminum in the form of foil. The anodes can also be separated by an insulator. In some embodiments, the pH is greater or equal to 12.

Figure 9:
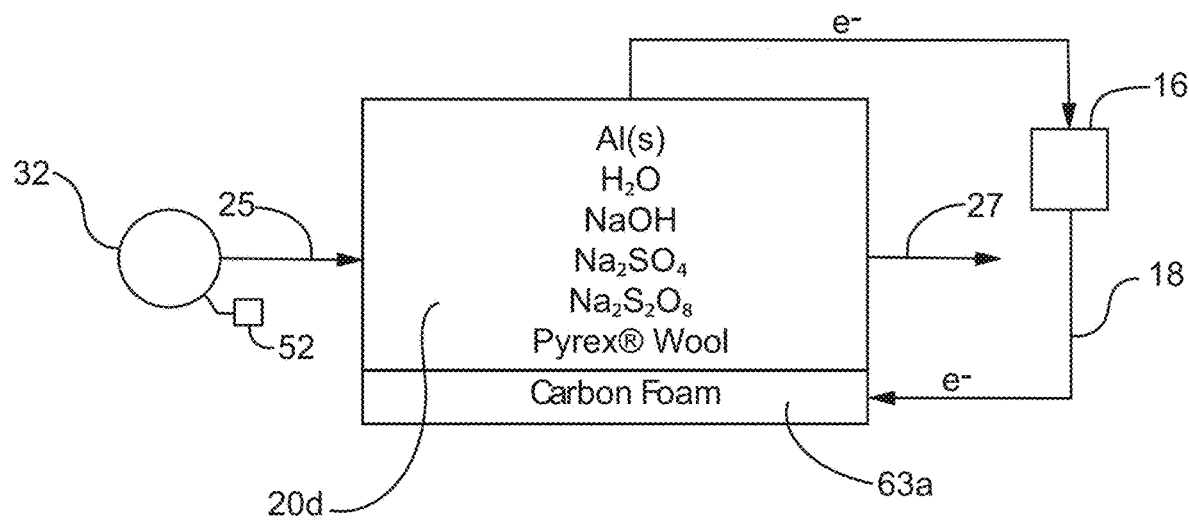
FIG. 9 is a schematic of an embodiment of an electrochemical cell of the disclosure.

An example of an electrochemical cell that can operate with a single electrolyte solution is provided in Example 7 and is illustrated in FIG. 9.

An additional embodiment of the disclosure includes a method of making an electrochemical cell of the disclosure. The method comprises 1) providing an electrochemical cell comprising an anode, a cathode current collector and a porous, non-conductive spacer between the anode and the cathode current collector; and 2) contacting the cell with a single electrolyte solution. The cell can be contacted with electrolyte solution, for example, by spraying the electrolyte solution onto the cell. The electrolyte could also be applied in bulk such as by immersion. The electrolyte solution could also be applied to the cell as droplets via drip or as an atomized mist. The electrolyte can also be supplied in bulk compartments, or in any combinations of the techniques provided herein.

A further embodiment includes a method, such as a method of operating an electrochemical cell in flow mode, that comprises 1) providing an electrochemical cell according to any of the embodiments above and that comprises a single electrolyte solution, 2) operating the cell to produce electricity, hydrogen, or both electricity and hydrogen (such as when the cell is connected to a load), and 3) providing additional electrolyte solution (or one or more components thereof) to the cell during its operation. Such an embodiment can further comprise 4) withdrawing spent electrolyte solution (or one or more components thereof) from the cell during its operation, for example, simultaneously with providing the additional electrolyte solution (or one or more components thereof) to the cell. The electrolyte solution in these embodiments may have any composition appropriate for the cells as described herein. Components of the electrolyte solution can include, for example, an oxidant, a metal salt, and a base. A further embodiment includes the method performed on a battery that comprises the cell.

In other aspects of the disclosure, electrochemical batteries comprising electrochemical cells of the disclosure are provided. An electrochemical battery contains one or more cells and is electrically connected to a load. The load could be the resistance in a wire or it could be to an application, or both. The electrochemical batteries of the disclosure may be used to generate electricity through the load, hydrogen, or both. The battery can be configured, for example, to favor electricity or hydrogen. Hydrogen production may be controlled by adjusting pH and the specific surface area of the anode. Starting with an alkaline solution, as the pH increases and the larger specific surface of the anode used, the more hydrogen produced. For example the surface area of the aluminum may be increase by folding over an aluminum screen multiple times. Electricity may be favored when oxidant concentration is increased and the solution is made increasingly alkaline.

Embodiments of the disclosure further include methods of delivering electricity, hydrogen, or both electricity and hydrogen, produced by the cells or batteries disclosed herein to an application. Such applications can include, for example, cell phone towers, vehicles and fuel cells.

Without being bound by theory, the following explanation is believed to explain how some embodiments of the electrochemical cells and batteries of the disclosure work. For example, in many embodiments the anode is aluminum, the cathode is a catholyte in contact with a carbon foam current collector, and the catholyte is an electrolyte comprising water, sodium sulfate, sodium hydroxide, and sodium peroxydisulfate where the carbon current collector and anode are stacked and separated by a porous, non-conductive spacer and each stack is electrically connected by a conductor such as copper wire. Such a configuration can generally be seen in FIG. 1 and FIG. 2.

Without being bound by theory, in such embodiments, the aluminum is oxidized per equation (A) at the anode and persulfate reduction occurs at the surface of the cathode current collector via equation (B)

$$2Al(s) \rightarrow 2Al^{3+} + 6e^- \tag{A}$$

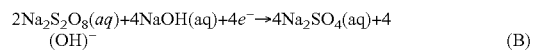

$$2Na_2S_2O_8(aq) + 4NaOH(aq) + 4e^- \rightarrow 4Na_2SO_4(aq) + 4(OH)^- \tag{B}$$

There are, however, two extra electrons available from the oxidation of aluminum. In many embodiments, it is observed that protons are reduced to form hydrogen gas at the aluminum anode. Thus, it is further believed that water dissociates to form $H^+$ and $OH^-$ and then the two extra electrons are available to reduce $H^+$ into hydrogen gas and such hydrogen gas evolution is observed at the aluminum anode and not the current collector where oxidant is reduced. It is also possible that the hydroxide ion itself may be dissociating to form $H^+$ because the same hydrogen evolution is observed when the electrolyte is ethanol. Accordingly, and as disclosed previously, the electrolyte could also be an alcohol and water or an alcohol with one example being ethanol.

In view of the above, the current collector could be characterized as a "cathode current collector," because it distributes electrons that reduce oxidant within the electrolyte solution at the surface of the current collector (according to equation B above), wherein the electrolyte solution can be characterized as a catholyte. The cathode current collector can be, for example, embedded in or otherwise suitably contacting the catholyte, wherein the catholyte is the source of oxidant for reduction at the cathode current collector.

In FIG. 1, a series of three electrochemical cells are shown. Each cell contains an anode 100, such as aluminum in the form of a sheet or screen. The anode 100 is in physical contact with a porous, non-conductive spacer 110. The spacer is a screen that prevents physical contact between the anode and the cathode current collector 120. The cathode current collector is often a carbon foam and the spacer may be surgical tape, for example, or vinyl coated polyester. The stack 160 of anode 100, cathode current collector 120 and spacer 110 may be optionally wrapped in surgical tape for physical integrity. Each cell is in electrical contact with an adjacent cell wherein the anode 100 and the cathode current collector 120 of adjacent cells are in electrical contact via a conductor, such as copper wire 130.

Electrolyte is deposited onto the cell, but the cell of FIG. 1 is not immersed in the electrolyte. The electrolyte may be sprayed on or delivered via atomization or compartmentalized. Often this is done so when carbon foam is the cathode current collector, the carbon foam is saturated. In other embodiments, the cell is immersed in electrolyte solution. In a wet condition, the electrolyte acts as a catholyte such that reduction occurs in the solution when a circuit is made.

Figure 2:
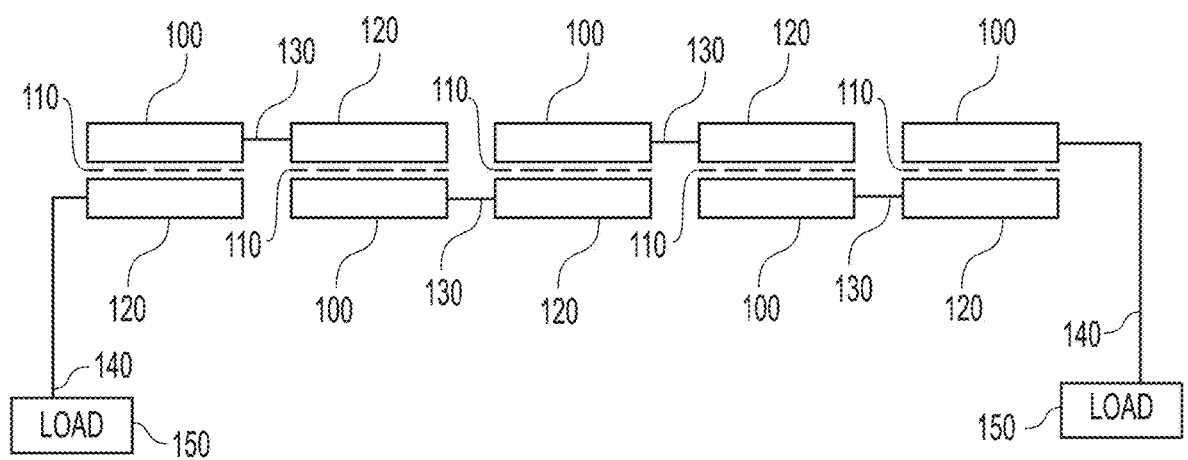
FIG. 2 is a schematic of one embodiment of an electrochemical battery of the disclosure.

FIG. 2 represents a battery wherein the cell components of FIG. 1 in series are further connected to a Load 150 via a conductor, such as copper 140. In this state, when electrolyte is deposited onto the battery, current and/or hydrogen is produced, with hydrogen reduction occurring at the anode. Depending on the pH, the surface area of the anode and the amount of oxidant used, one can determine whether the battery produces primarily electricity, hydrogen, or a combination of the two. The Load 150 could be an application such as cell tower or other grid application. Alternatively, when hydrogen is produced, the hydrogen can be collected at each anode for delivery to, for example a fuel cell or to a furnace or engine for burning hydrogen.

Additional embodiments described below include certain membraneless electrochemical cells that contain separate first and second electrolyte solutions at the cathode and anode, respectively; batteries comprising electrochemical cells of the disclosure; methods of delivering hydrogen, electricity or both with the cells and batteries to applications; methods for boosting current in electrochemical cells of the disclosure; and various methods related to these embodiments.

For example, one embodiment of the disclosure includes an electrochemical cell comprising:
a. a cathode;
b. an anode adjacent to the cathode at a distance;
c. a first polar electrolyte solution in contact with the cathode and disposed within the distance comprising an oxidant;
d. a second polar electrolyte solution in contact with the anode and disposed within the distance comprising a suitable metal ion; and
e. a separation agent;

wherein the first and second electrolyte solutions are in contact with each other and are immiscible, and wherein there is no membrane in between the first and second electrolyte solutions.

In this embodiment, each polar electrolyte solution may comprise a porous stabilizer such as borosilicate. The first polar electrolyte solution may be aqueous and may also comprise a base such as KOH, NaOH, Ca(OH)$_2$, LiOH, RbOH, CsOH, Sr(OH)$_2$, or Ba(OH)$_2$. The pH of the first polar electrolyte solution may be, for example, between about 8 and about 14 or between about 11 and about 14. The oxidant may be, for example, a Vanadium ion, $S_2O_8^{2-}$ or ClO$^-$. An example separating agent in this embodiment includes a salt, such as a calcium chloride or sodium sulfate.

The electrochemical cell may be configured to operate in flow mode. It may comprise, for example, an inflow solution comprising a base (such as sodium hydroxide), an oxidant (such as $S_2O_8^{2-}$) and a separation agent (such as sodium sulfate). Outflow from the cell may include a base (including an aqueous solution of a base) and sodium sulfate, where the base may be sodium hydroxide.

A current collector may be placed within the first electrolyte solution, the second electrolyte solution, or in both. Example current collectors include metals as well as nonmetals such as carbon foam. The electrochemical cell may also comprise glass wool placed in between the first and second polar electrolyte solutions.

In some embodiments, the second polar electrolyte solution comprises an alcohol. It may be an alcoholic solution that further comprises a base such as KOH or NaOH. The pH of the second polar electrolyte solution may be, for example, between about 8 and about 14 or between about 11 and about 14. Suitable metal ions in the second polar electrolyte include $Zn^{2+}$ and $Al^{3+}$.

In some embodiments, the separation agent is a salt (such as CaCl$_2$ or sodium sulfate) and the alcohol in the second polar electrolyte solution is ethanol, methanol, or both. In some embodiments, the second polar electrolyte comprises an alcohol and is configured to operate in flow mode with an inflow stream comprising a polar solution comprising an alcohol (such as ethanol, methanol, or both), a base (such as sodium hydroxide), a separation agent, and a metal capable of dissociating into a suitable metal ion (such as Al$^{3+}$). An outflow stream for the cell may comprise an alcohol (such as ethanol), a base (such as sodium hydroxide) and a separation salt (such as sodium sulfate).

The electrochemical cell described here may, for example, generate hydrogen gas in the second electrolyte solution and may direct the gas to a hydrogen compressor. A further embodiment of the disclosure therefore includes a battery system comprising one or more of the electrochemical cells and a hydrogen compressor. Such a system may be used, for example, to power a process application such as a fuel cell.

Another embodiment of the disclosure includes an electrochemical cell comprising:
a. a cathode;
b. an anode adjacent the cathode at a distance;
c. a first polar aqueous electrolyte solution in contact with the cathode and disposed within the distance comprising $S_2O_8^{2-}$;
d. a second polar electrolyte alcoholic solution in contact with the anode and disposed within the distance comprising Al$^{3+}$; and
e. borosilicate within both the first and second electrolyte solutions; wherein the first and second electrolyte solutions are in contact with each other and are immiscible, and wherein there is no membrane in between the first and second electrolyte solutions.

The first polar electrolyte solution and second polar electrolyte solution may be of different densities, where the first electrolyte solution may comprise a halide salt (such as CaCl$_2$) and the second electrolyte solution may comprise a metal sulfate salt (such as Na$_2$SO$_4$). The second polar electrolyte alcoholic solution may comprise, for example, ethanol or methanol.

In some embodiments, the pH of the first electrolyte and second electrolyte solutions can be adjusted, for example, to between about 11 to about 13 each. Each solution may comprise a base, such as sodium, calcium, or potassium hydroxide. In some embodiments, the cathode is copper (such as a copper brush), carbon, or both and the anode is aluminum. The borosilicate may be, for example, Pyrex® wool. In some embodiments, the borosilicate has a pore size of about 8 microns.

This electrochemical cell may be configured to run in flow mode. An additional embodiment includes an electrochemical battery comprising one or more of the cells. When the battery comprises more than one of the electrochemical cells, the cells may be aligned, for example, in parallel geometry and arranged in a voltaic pile. The electrochemical cell or battery could deliver electricity to a process application, including solar farms, wind farms, household appliances, consumer goods, and toys.

Another embodiment of the disclosure includes an electrochemical cell comprising:
a. a non-metallic cathode;
b. a non-metallic anode adjacent the cathode at a distance;

c. a first polar aqueous electrolyte solution in contact with the cathode and disposed within the distance comprising $S_2O_8^{2-}$; and d. a second polar electrolyte alcoholic solution in contact with the anode and disposed within the distance comprising a metal solid;

wherein the first and second electrolyte solutions are in contact with each other and are immiscible, and wherein there is no membrane in between the first and second electrolyte solutions.

In some embodiments, the metal solid is dispersed through the second electrolyte solution in powder form while borosilicate is placed within both the first and second electrolyte solutions. Example metals include zinc and aluminum. Metal in powder form may have, for example, an average particle size less than about 5 microns, or an average particle size between about 5 and about 30 microns. Non-metallic cathodes and non-metallic anodes can be made of carbon foam, for instance. A further embodiment includes a method of boosting current in an electrochemical cell comprising the steps of adding oxidant to the second electrolyte solution of this electrochemical cell.

Another embodiment of the disclosure includes an electrochemical cell comprising:

a. a cathode;

b. an anode adjacent to the cathode at a distance;

c. a first aqueous electrolyte solution in contact with the cathode and disposed within the distance comprising an oxidant;

d. a second polar electrolyte solution in contact with the anode and disposed within the distance comprising a metal and an oxidant; and e. a separation agent;

wherein the first and second electrolyte solutions are in contact with each other and are immiscible, and wherein there is no membrane in between the first and second solutions.

In some embodiments, the second polar electrolyte solution is an alcoholic solution such as ethanol or methanol. Also in some embodiments, the oxidant is $S_2O_8^{2-}$ or sodium peroxydisulfate, or both, the metal is aluminum, the separation agent is sodium sulfate, and the cathode and anode are carbon foam. A porous stabilizer (such as glass wool, borosilicate, or both) may optionally be provided in the first and second electrolyte solutions.

The electrochemical cell may be configured to operate in flow mode. The cell may comprise an inflow stream that comprises an aqueous electrolyte solution and optionally also an oxidant (such as sodium peroxydisulfate or a solution comprising peroxydisulfate anion or both). Thus, an embodiment of the disclosure is a method which comprises providing additional oxidant to the electrochemical cell. The oxidant (such as $Na_2S_2O_8$) may be provided in an aqueous basic solution, for example, where the base may be NaOH. The oxidant may also be provided as a solid. The cell may further comprise an aqueous solution that outflows from the cell and that may comprise, for example, metal sulfate.

In some embodiments, the cell may produce between about 10 Watt-hours/(kg of electrolyte+anode metal) and about 680 Watt-hours/(kg of electrolyte+anode metal). When measured per kg of electrolyte, the cell may produce, for example, between about 10 Watt-hours/kg of electrolyte and about 100 Watt-hours/kg of electrolyte, and such as between about 40 Watt-hours/kg of electrolyte and about 80 Watt-hours/kg of electrolyte.

The following disclosure provides further description of the embodiments detailed above and other embodiments of this disclosure.

Various embodiments of the disclosure, such as ones mentioned above, include an electrochemical cell that contains a single electrolyte solution. In some embodiments, a single electrolyte solution contains a metal solid, water, base, an oxidant, and a cathode current collector. The solution is basic in some embodiments. Electrical contact is made between the cathode current collector, such as carbon foam, and the metal solid via an external load. A common metal example is aluminum, such as aluminum foil, a base, such as sodium hydroxide, and the oxidant added may be sodium peroxydisulfate, which in turn dissociates. When operating, the peroxydisulfate reduces to sulfate. Additional sulfate, such as by the addition of a metal sulfate such as sodium sulfate, may be added. A porous stabilizer, such as glass wool or a borosilicate may be used. In such embodiments, there is only a single electrolyte solution and it may be operated in a flow mode whereby oxidant is refilled into the cell. The added oxidant may be as an aqueous solution such as with a base like sodium hydroxide or added as solid such as with granular sodium peroxydisulfate. As sodium sulfate forms in the cell, it may optionally be removed by an apparatus for desalinization or by other mechanisms.

Supercharging may also be achieved with two electrolyte solutions. In these embodiments, oxidant, such as sodium peroxydisulfate is added to the second electrolyte solution. In these embodiments, the metal in the second electrolyte solution can be aluminum and the solution is an alcoholic solution such as methanol, ethanol, or both. A porous stabilizer such as glass wool or a borosilicate may also be used. A base such as sodium hydroxide is present as is a separating agent such as sodium sulfate. The first electrolyte solution in such embodiments can be aqueous and is kept basic such as with NaOH. An oxidant such as sodium peroxydisulfate is used and a metal sulfate such as sodium sulfate is optionally added. A porous stabilizer such as glass wool or a borosilicate may also be used. In such embodiments, peroxydisulfate, or another suitable oxidant, is added to the second electrolyte solution and this addition causes a boost in current production. Such current boosts may be on the order of 50%.

The power produced by the single-solution embodiments may be, for example, between about 10 Watt-hours/(kg of electrolyte+anode metal) and about 680 Watt-hours/(kg of electrolyte+anode metal). When measured per kg of electrolyte, the cell may produce, for example, between 10 and 100 Watt-hours/kg of electrolyte, including between about 40 and about 80 Watt-hours/kg electrolyte and further including between about 10 and about 60 Watt-hours/kg electrolyte. When measured against the surface area of the metal solid used, such as with aluminum, power densities of between about 600 and about 1000 mW/cm$^2$ are observed.

Without being bound by theory, it is believed that upon opening the circuit in a single electrolyte system, the anode becomes negatively charged and is surrounded by an ionic double layer and, for example, when considering a capacitor based on the electrochemical cell of FIG. 9, the sodium and sulfate ions make up the ionic double layer. The sodium concentrates next to the negatively charged surface (the stern layer) and both the sodium and sulfate ions form a diffuse layer out from the surface. Such a capacitor is in fact a self-charging capacitor. With respect to the cell of FIG. 9, for example, when the battery circuit is opened, the $S_2O_8^{2-}$ anion or $2H^+$ cations continue to interact with the solid aluminum atoms while trying to place them into the unstable +2 oxidation state. To compensate for this instability, the oxidized aluminum atoms shed a third electron to the solid aluminum, but because the circuit is open, the solid aluminum cannot transfer the electron to the cathode current collector. This effect negatively charges the solid aluminum, and to maintain charge neutrality, a classical double layer distribution of ions is formed, with the cations packed near the solid aluminum surface. When the circuit is closed these stored electrons are shipped to the cathode current collector, but again because of the need to maintain charge neutrality, they are not all shipped at once, but rather released with a peak initially that gradually declines over time owing to the gradual redistribution of ions in the double layer which relaxes on an electro-chemical diffusion gradient. By staggering the opening and closing of circuits, multiple anodes can be employed to maximize the current (while one anode circuit is open it charges and another can be closed and discharging).

Without being bound by theory, aluminum can exist in the non-negative oxidation states +3, +2, +1 and 0, but only the +3 and 0 states are energetically stable under standard battery operating conditions, with the 0 state being the solid aluminum phase. When a strong oxidant such as $S_2O_8^{2-}$ or $2H^+$ reacts with an aluminum atom in the 0 state, it strips 2 electrons from the solid aluminum atom (reducing itself to $2SO_4^{2-}$) while trying to put the aluminum atom into the energetically unstable +2 oxidation state. Because this state is energetically unfavorable, the aluminum atom sheds a third electron to put it in the stable +3 state. The third electron is conducted through the solid aluminum to the load and subsequently to the cathode current collector, wherein the catholyte reduces another $S_2O_8^{2-}$ anion.

By comparison, Zn can exist in the non-negative oxidation states +2, +1 and 0, but only the 0 and +2 states are energetically favored. Thus when the $S_2O_8^{2-}$ anion reacts with a zinc atom in the 0 oxidation state it strips two electrons from the zinc atom putting it in the stable +2 state, and no current is generated. However, if there is an oxidant in the −1 state which is capable of striping a single electron from the zinc, then as in the aluminum case, a current can be generated.

In such single-electrolyte systems, pairs of oxidants and reductants may be selected such that the oxidant removes sufficient electrons to create an unstable oxidation state in the reductant which may spontaneously transition to a stable oxidation state with the release of one or more additional electrons. In such pairs, the unstable oxidation state is a lower oxidation state than the stable oxidation state. The stable oxidation state may have an oxidation state that is +1 or +2 or more compared with the unstable oxidation state. In aluminum, for example, the stable oxidation state, +3 is one more (+1) than the unstable oxidation state.

In many embodiments of such single-electrolyte electrochemical systems, multiple anodes may be used with a single cathode current collector. For example, when the anode is aluminum, aluminum foil packets may be separated from each other such as with an insulator to create multiple aluminum anodes. If particulate aluminum is used, such individual particles may act as multiple anodes.

The pH can also be used to control current. When the pH is neutral, the $S_2O_8^{2-}$ is unable to oxidize the solid aluminum because an $Al_2O_3$ film forms on the solid surface. When the system is very alkaline, such as greater than pH of 12 or even higher, the $OH^-$ anion destroys the aluminum oxide film and allows the $S_2O_8^{2-}$ anion to thereby create a current. By adjusting the pH, either with the addition of OH− ions, such as from NaOH, or by the addition of H+ ions, such as with the addition of sulfuric acid, the availability of OH− and thus control the current can be regulated. Lower pHs may also work, such as at around 10, provided the surface is sufficiently activated.

In other embodiments, electrochemical cells and batteries of the disclosure operate without the need for membranes or other devices to separate a first electrolyte solution (at the cathode) from a second electrolyte solution (at the anode). When the terms "membraneless" or "without a membrane" or "wherein there is no membrane" or words to that effect are used, what is meant is that there is no membrane or other kind of separator between the first and second electrolyte solutions (and third electrolyte solutions in those embodiments).

Electrochemical batteries of one or more cells, including greater than one cell, may be prepared by combining electrochemical cells of the disclosure in parallel or in series. Examples include a voltaic pile of cells. Such cells and batteries may be used to deliver electricity to process applications such as solar farms and wind farms, hydrogen compressors, vehicles, such as electric vehicles, electrical grids, household appliances, consumer products, and toys.

Cathodes and anodes in electrochemical cells in this disclosure, including in this embodiment and other embodiments of electrochemical cells described herein, may be selected from suitable materials. Examples of suitable cathodes include steel, carbon such as in the graphite allotrope of carbon, carbon impregnated with a metal, and carbon foam. Conducting carbon cloth (which is also referred to as carbon foam), for example, is a suitable cathode for many embodiments and is a conducting material. Suitable anodes for embodiments of the membraneless cells with multiple electrolytes include platinum, zinc, lithium, nickel, calcium, magnesium or aluminum as well as non-metallic materials such as carbon, including carbon foam.

First and second electrolyte solutions included in embodiments of the disclosure may be polar and of different densities. In many examples, one or more of the first polar electrolyte solution contains water and a separation agent. In these and other embodiments of the disclosure, the two polar electrolyte solutions are immiscible. When the first electrolyte solution comprises $H_2O$ and the second electrolyte solution comprises ethanol, methanol, or a combination thereof, the solutions would normally be miscible. However, the separation agent may be used to make such fluids immiscible. The separation agent may be added to a mixture of an alcohol and water and at sufficient concentration it will separate the two solutions and maintain their immiscibility. The separation agent is often a salt. In some embodiments, the solution is saturated with respect to the salt. Examples of salts include metal halides or ammonium salts such as sodium chloride, magnesium chloride, calcium chloride, lithium chloride and ammonium chloride. Other such salts include sodium sulfate, calcium sulfate, potassium sulfate, and ammonium sulfate among others. The same or different salts may be present in the first or second electrolyte solutions. For example, sodium sulfate may be present in both. In other embodiments, a salt such as sodium sulfate or sodium chloride may be present in the first electrolyte solution and ammonium chloride in the second electrolyte solution. In still other embodiments calcium chloride may be present in the first electrolyte solution and sodium sulfate in the second. The salts are often saturated in the respective solution at or near their solubility limit.

In many cells of the disclosure, the first electrolyte solution is an aqueous solution and the second electrolyte solution is an alcoholic solution. The solution at each electrode must contain the necessary components so that oxidation-reduction will occur, thus generating electricity. Suitable alcohols for use in the second electrolyte solution include methanol and ethanol.

Examples of polar solvents for use in first or second electrolyte solutions may be found in Table 1 above. The solvent for the particular system selected should be of sufficient dipole moment so as to dissociate the corresponding salts placed in the solvent. In some embodiments, a strong acid, such as sulfuric acid (e.g., 1M) may be used to make the first polar electrolyte solution acidic while the second polar electrolyte solution is neutral.

In other embodiments, both the first and second polar solutions are basic. These solutions may be made basic such as by the addition of a base such as LiOH, RbOH, CsOH, Sr(OH)$_2$, Ba(OH)$_2$, NaOH, KOH, Ca(OH)$_2$, or a combination thereof. To complete an electrochemical circuit, an oxidant is added to the first polar electrolyte solution and a suitable metal ion is added to the second polar electrolyte solution. A common polar solvent used for the first polar electrolyte solution is water. Common solvents used for the second electrolyte solution include ethanol, methanol, acetonitrile, or combinations thereof.

Examples of oxidants can be found in Table 2 above and examples of compounds which may dissociate into suitable metal ions in solution can be found in Table 3 above. Any metal ion oxidant pair may be chosen provided the metal oxidation by the oxidant is thermodynamically spontaneous. Metal ions which are commonly used in the disclosure include Al, Zn, Sn, and V.

Figure 3:
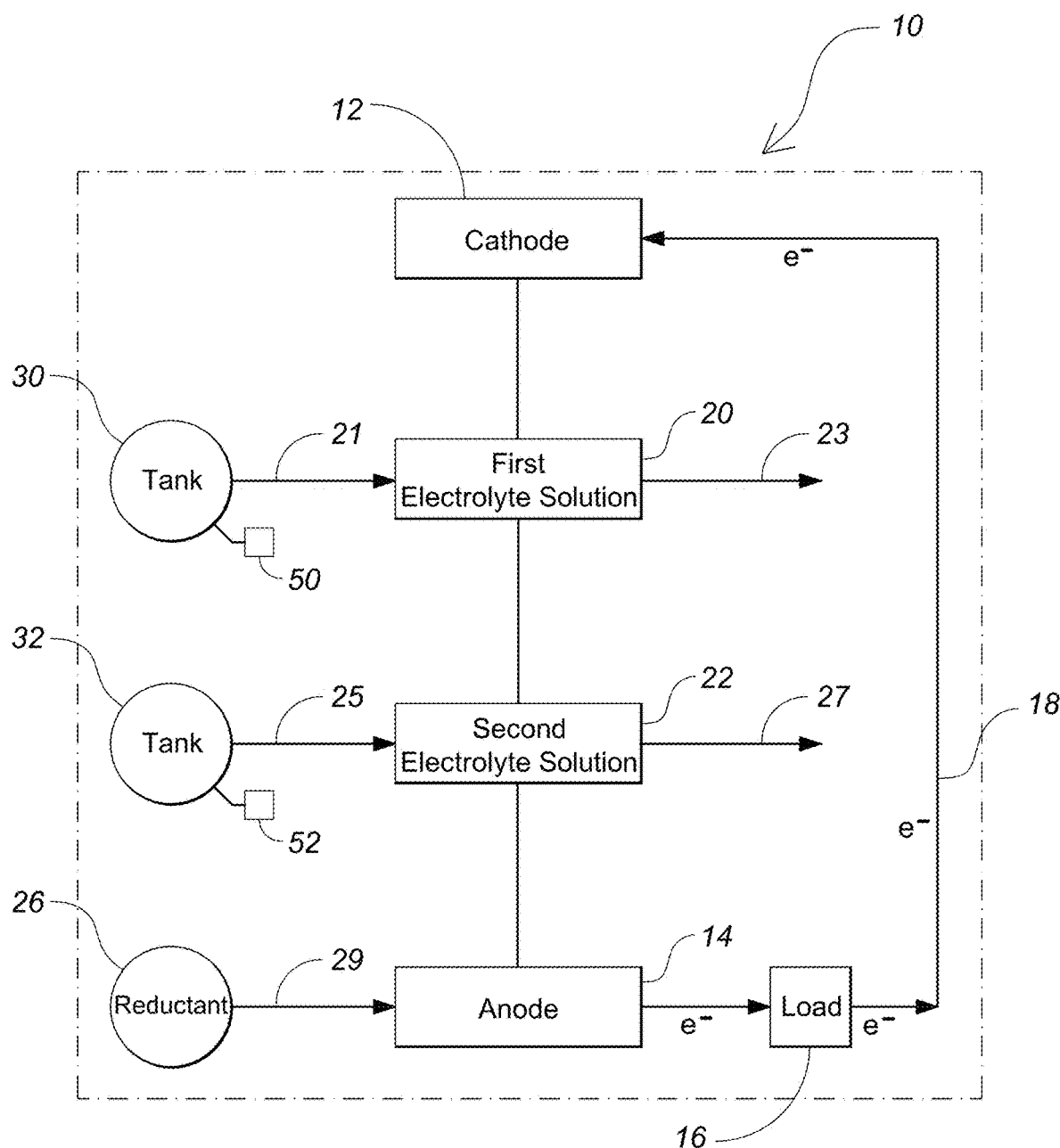
FIG. 3 is a schematic block diagram of an embodiment of an electrochemical cell according to the present disclosure.

FIG. 3 illustrates an embodiment of an electrochemical cell that comprises first and second electrolytes. The electrochemical cell 10 includes a cathode 12 and an anode 14 separated by a first electrolyte solution 20 and a second electrolyte solution 22 such that the first electrolyte solution 20 is in contact with the cathode 12 and such that the second electrolyte solution 22 is in contact with the anode 14. The first electrolyte solution 20 and the second electrolyte solution 22 are immiscible and in contact with each other and thus can enable ion and electron exchange (e.g., H$^+$ and e−) between the anode 14 and the cathode 12. Each cell 10 may be electrically connected to a load 16 by a circuit 18 to enable a current flow via the circuit. Note that the vertical lines connecting the electrolyte solutions and the cathode and anode electrodes in the schematic are not conduits but are merely to aid in the viewing of the schematic.

In certain embodiments, the first electrolyte solution 20 may be a positive electrolyte or catholyte, and the second electrolyte solution 22 may be a negative electrolyte or analyte (and immiscible). In many embodiments, the densities of the first electrolyte solution and the second electrolyte solution are different with the first electrolyte solution 20 being denser than the second electrolyte solution 22 such that when the cell 10 is oriented vertically with cathode 12 at the bottom, the buoyancy effect causes the second electrolyte solution 22 to layer above the first electrolyte solution 20.

In many embodiments, the cell 10 may optionally be configured to run in flow mode so as to support a flow battery for example. In such a battery, electrolyte solutions are provided to the cell during the operation of the battery continuously during operation. For example, the first electrolyte solution 20 and the second electrolyte solution 22 may flow into the cell 10 and between the cathode 12 and the anode 14 from a first source, such as a tank, 30, or other suitable storage device, and a second source, such as a tank, 32, or other suitable storage device, respectively, as shown in FIG. 3 via conduits 21 and 25 respectively. The first electrolyte solution 20 and second electrolyte solution 22 may further flow out of the cell 10 via conduits 23 and 27 respectively. They may be directed to waste or to other tanks. In some embodiments, flow could be reversed from said other tanks to recharge cell 10. The flows may be generated by pumps 50, 52 or by capillarity, reverse osmosis, a ratchet, swelling pressure, or gravity. The flows of the first electrolyte solution 20 and the second electrolyte solution 22 may be maintained within a laminar flow regime. In alternative embodiments, the first electrolyte solution 20 and the second electrolyte solution 22 may not flow through the cell 10 but may be replaceable.

When an electrolyte solution is prepared, typically an electrolyte, often a solid, is disposed within a solvent which then becomes an electrolyte solution. For example, when an electrolyte is disposed within a solvent where it can dissolve, the dissolution of the electrolyte solid will create ions and, if they dissociate sufficiently, the solvent becomes an electrolyte solution. In addition, other components are added to the solvent so that oxidation will occur at the anode and reduction at the cathode. Examples of such a component is zinc metal. When added at the anode of an operating electrochemical cell, zinc will oxidize to $Zn^{2+}$. On the cathode side, one such component example is $NH_4VO_3$ which dissolves and dissociates to produce $V^{5+}$, which will be reduced to $V^{4+}$ in an operating electrochemical cell. In many such embodiments of the disclosure, the first electrolyte solution comprises a component which dissociates into an ion selected from $ClO^-$, $Fe^{3+}$, $V^{5+}$, $Br_2$, and $S_2O_8^{2-}$, which ions are reduced at the cathode. In these and other embodiments, the second electrolyte solution comprises a component which oxidizes into an ion selected from $Li^+$, $Ca^{2+}$, $Al^{3+}$, $Mg^{2+}$, $V^{2+}$, $Zn^{2+}$, $SiO_3^{2+}$, $[Zn(CN)_4]^{2-}$, and $[Zn(OH)_4]^2$, which ions result from oxidation at the anode.

In some embodiments, the cathode, vanadium undergoes reduction from $V^{5+}$ to $V^{4+}$. In that embodiment, at the anode, zinc is oxidized from $Zn(s)$ to $Zn^{2+}$. To enable the flow of positively charged ions, a methanol solvent with zinc solid on the anode side is further charged with ammonium chloride. The ammonium chloride dissolves and dissociates sufficiently to provide $NH_4^+$ in solution as a positively charged ion and $Cl^-$ as a negatively charged ion. On the cathode side, positively charged ions are provided by adding both sulfuric acid ($H_2SO_4$) and sodium sulfate ($Na_2SO_4$) to an aqueous $V^{5+}$ solution. The dissolution and dissociation into $H^+$ and $Na^+$ provides positively charged ions and $SO_4^{2-}$ as a negatively charged ion on the cathode side of the electrochemical cell. In addition, the sodium sulfate prevents the mixing of the first and second electrolyte solutions and maintains their immiscibility. Further, since water is denser than methanol, buoyancy forces cause the methanol solution to layer on top of the denser aqueous solution. This layering of immiscible fluids (salt water is immiscible with methanol or ethanol) effectively and advantageously eliminates the need for a membrane for separation. Such embodiments may be configured for flow or for no-flow operation as described further herein. Further, in such embodiments the zinc may be in contact with a conducting material such as conducting carbon and the cathode solution may also be in contact with such a conducting material.

In some embodiments, the anode is aluminum and the cathode is carbon or steel, the first electrolyte solution contains water and $ClO^-$, and the second electrolyte solution contains ethanol or methanol. In such embodiments, for example, each electrolyte contains a base such as NaOH, and a salt, LiCl which results in immiscible electrolyte solutions. The voltage supplied by such an electrochemical cell is between 1.5 and 2.1 volts. Such an electrochemical cell may create amperages of between about 0.1 and about 0.4 amps including about 0.2 and about 0.3 amps. Examples of components providing ClO⁻ include Na(ClO) and Ca(ClO)$_2$. In such a cell, ClO⁻ will be reduced at the cathode according to equation 1:

$$ClO^- + H_2O + 2e^- \rightarrow Cl^-(aq) + 2OH^-(aq) \qquad \text{EQ. 1}$$

The second electrolyte may contain a component that is a metal that oxidizes, such as aluminum oxidizing to Al$^{3+}$ as per equation 2:

$$Al(s) \rightarrow Al^{3+}(aq) + 3e^- \qquad \text{EQ. 2}$$

Another anode choice may be magnesium which oxidizes per equation 3:

$$Mg(s) \rightarrow Mg^{2+}(aq) + 2e^- \qquad \text{EQ. 3}$$

or Vanadium which oxidizes per equation 4:

$$V(s) \rightarrow V^{2+}(aq) + 2e^- \qquad \text{EQ. 4}$$

In some embodiments, the anode is lithium solid and the solvent is propylene carbonate and dimethoxyethane. The cathode may be a suitable metal such as copper, with sodium sulfate also added. In these embodiments, both the anode and cathode electrolyte solutions contain a salt. An example salt is a metal halide salt such as MgCl$_2$. When MgCl$_2$ is used in the electrolyte solutions, a voltage of 3.15 V and a current of 0.1 A/cm² may be achieved at 1 ohm resistance. When amperages are recorded as A/cm² what is meant is amperage per areal area as opposed to specific area. For example, a 2 square centimeter piece of carbon foam has a much higher specific area than its 2 square centimeter areal area.

In other embodiments, the first polar aqueous electrolyte solution contains S$_2$O$_8^{2-}$, NaOH, a salt, such as a metal sulfate or metal halide salt such as CaCl$_2$, and a metal cathode such as a copper, such as a copper brush, carbon foam, or a combination thereof. An example of a metal sulfate salt is Na$_2$SO$_4$. The S$_2$O$_8^{2-}$ ion originates from a salt which dissociates into that ion in, for example, the first electrolyte solution. The salt may be, for example, Na$_2$S$_2$O$_8$. The copper may be in wire form such as a brush, for example. The second polar alcoholic electrolyte solution, for example of a different density that the first electrolyte solution, contains an alcohol such as methanol, ethanol, or both, NaOH, a salt such as a sulfate, including metal sulfates such as Na$_2$SO$_4$. An example anode is a metal anode such as aluminum. Alternatively, the anode may be a non-metallic material such as carbon foam and a metal solid, such as in a powder form, may be dispersed within the anode solution. Examples of such metal powders, include aluminum and zinc. The metal powder in the solution is oxidized by the action of the electrochemical cell in a similar manner as it would oxidize if the anode itself were the metal.

In some embodiments, the first polar solution is aqueous and contains a separation agent such as a salt like CaCl$_2$ or Na$_2$SO$_4$. The cathode in contact with the first electrolyte solution in such embodiments may be a metal like copper or a non-metal like carbon foam. A stabilizer such as glass wool or a borosilicate such as Pyrex® may be used. The oxidant in such solutions is often S$_2$O$_8^{2-}$ which may be sourced from Na$_2$S$_2$O$_8$, for example. In such embodiments, the second polar solution is often an alcohol such as ethanol or methanol. The anode in contact with the second electrolyte solutions in such embodiments is often aluminum or carbon foam. Separation agents, such as Na$_2$SO$_4$ are often deployed at or near saturation concentrations in the first polar electrolyte solution, the second polar electrolyte solution, or both. Suitable metal ions are often Aluminum such as Al$^{3+}$ which may be sourced, for example from Aluminum foil or Aluminum powder. Zn$^{2+}$ may also be used, for example, in such embodiments. Both the first and second polar electrolyte solutions can be rendered basic by a base such as NaOH where the pH is greater than and often between 11 and 14. In many such embodiments, hydrogen gas is generated in the second polar electrolyte solution. Such gas may be vented and delivered to a process application like a fuel cell. The hydrogen can be fed to a hydrogen compressor prior to delivery, for example. Electricity generated from one or more cells may be used to power the hydrogen compressor. The electrochemical cell may be run in a flow mode in such operations where electrolyte solution is replenished and spent solution removed.

When being replenished, the inflow solution may be an aqueous solution comprising a base, an oxidizing agent, and a separation agent for the first polar electrolyte solution and comprising an alcohol, a metal capable of dissociating into a suitable metal ion, a base and a separation agent. The outflow solutions comprise an aqueous solution of base and separation agent for the first electrolyte solution and alcohol, base, and separation agent for the second polar electrolyte solution. When the suitable metal ion is Al, the outflow may also contain Al$_2$O$_3$.

In certain aspects of these embodiments, the pH of each solution is made basic by the use of NaOH, KOH, Ca(OH)$_2$, or another base. With such a base, the pH may be adjusted to between about 8 and about 14, between about 9 and about 14, between about 10 and about 14, between about 11 and about 14, between about 12 and about 14, between about 11 and about 13 and all values between about 8 and about 14 including about 8, 9, 10, 11, 12, 13, and 14.

The electrochemical cells may further contain a porous stabilizer. The porous stabilizer allows for the passage of fluid and also can be placed across the first and second electrolyte solutions and help maintain the separation between the solutions including during turbulent movement. A porous stabilizer may be any porous media, Examples of porous stabilizers are glass wool and borosilicates including Pyrex®. The porous stabilization may be used in each of the first and second electrolyte solutions and it enables the electrochemical cell containing the two electrolyte solutions to spin, bounce or rotate rapidly with little fluid displacement. Examples of borosilicate include such borosilicate with a pore size of about 8 μm. Pyrex® wool is one such borosilicate. Such electrochemical cells may be run in a flow or non-flow mode. Such electrochemical cells can have superior current density and voltages than cells of the prior art. For example, electrochemical cells of these embodiments have been measured for 18 hours at 1 ohm resistance with starting voltages and amperages of about 2.07 V and 0.16 A/cm² and concluding at about 1.55 V and 0.088 A/cm².

The use of porous stabilizers affects some or all of the following characteristics of batteries and electrochemical cells of the disclosure: wettability boundary conditions; no slip and slip boundary conditions; conductivity, including resistivity and friction; dispersivity or mixing between adjacent fluids; porosity (e.g., relative volume for flow); tortuosity (e.g., length and complexity of trajectories); connectivity (e.g., species and electrical); particle size distribution (e.g., packing); relative conductivity (e.g., multiphase resistivity); multiscale (e.g., discrete scale separation); surface absorptivity (e.g., double layer capacitance); surface reactivity (e.g., pseudo capacitance); diagenesis (e.g., dissolution or deposition); and swelling (e.g., interfacial forces). The porous media may include nanostructures or nanoparticles. Such porous media may be used, for example, at the cathode or anode. Further examples of such porous media include micro-porous or nano-porous graphite.

Separators or interconnects may be used to separate adjacent cells to prevent short circuiting such batteries but still provide for electrical communication.

Stabilizers may also be used in between the first and second electrolyte solutions of an electrochemical cell.

When the anode is non-metallic, such as carbon foam, and a metal, such as aluminum or zinc, is added as a solid to the anode solution, it is often in the form of a powder and a common particle size is one where the average size is less than 5 microns. In other embodiments, the average size is between about 5 microns and 30 microns. In many embodiments, the powder is dispersed throughout the solution so that the solution appears cloudy. Such a dispersion is useful for the performance of the cell. Generally, the smaller the particle, the longer it takes for the particles to settle out from the dispersion in accordance with Stokes' law. Thus, from a suspension stability stand point, smaller particles are favored.

At the cathode, the half-cell reaction for some such embodiments is:

$$S_2O_8^{2-} + 2e^- \rightarrow 2SO_4^{2-} \quad \text{EQ. 5}$$

whereas the half-cell reaction at the anode for some such embodiments is:

$$Al(s) \rightarrow Al^{3+} + 3e^- \quad \text{EQ. 6}$$

when aluminum is the anode or is suspended in the anode solution as a solid and

$$Zn(s) \rightarrow Zn^{2+} + 2e^- \quad \text{EQ. 7}$$

is the half-cell reaction at the anode the anode itself is zinc, or is suspended in the anode solution as a solid.

In these and other embodiments, hydrogen gas may be liberated by the chemical reactions within the electrochemical cell under basic conditions. Advantageously, and unlike with hydrogen production from petroleum products, hydrogen may be created without the liberation of $CO_2$ or $CO$. The resulting hydrogen may be collected for storage or redistribution or routed to a second electrochemical cell with a platinum membrane for additional energy generation. For example, when the suitable metal ion is $Al^{3+}$ and the second polar electrolyte solution contains a polar solvent such as a methanol, ethanol or both, hydrogen gas may be liberated as a result of subsequent reactions in such electrochemical cells. A suitable oxidant herein is $S_2O_8^{2-}$.

Thus, there are three separate reactions that are occurring. In one, protons are being reduced to form hydrogen gas at the anode. In another, aluminum is being oxidized and forms $NaAl(OH)_4$. Lastly, at the cathode, oxidant (such as $S_2O_8^{2-}$) is reduced to $SO_4^{2-}$.

The rate at which hydrogen gas is generated, for fixed concentrations of reactants, is a function of the distance between the copper/carbon and metal, such as aluminum, in the second polar electrolyte solution, for example, aluminum. The greater the distance, the lower the rate hydrogen gas is released and the lower the current. In addition surface area affects the rate in that the greater the surface area, generally the greater the rate of hydrogen produced. Hydrogen may be produced in a flow or non-flow mode.

In order for the electrochemical cell to produce electricity spontaneously, the metal anode is oxidizable by the oxidant and the oxidant is reduced at the cathode. When the electrochemical cell of the disclosure is further used to generate hydrogen gas, then a suitable metal ion is present in the anode side along with a base such as NaOH in a polar solution comprising for example, methanol or ethanol. Suitable metals are those which produce hydrogen when placed in contact with a base in the second polar electrolyte solution. Such metals have a metal-metal ion redox potential that is negative. Examples of such fluids include alcohols such as methanol, ethanol, propyl alcohol, or isopropyl alcohol. Water is another such fluid such as in a mixture with an alcohol, however, in the presence of a separating salt, water tends to collect on the cathode side of an electrochemical cell of the disclosure. The amount of hydrogen that is created from a battery may be up to about 100 kg of hydrogen per day including between about 10 kg and 100 kg and all values in between. Hydrogen gas may be collected for use in such electrochemical cells. A single electrochemical cell with 3 $cm^2$ Al metal placed in the second polar electrolyte solution was measured in an electrochemical cell set up generally in accordance with FIG. 8 to produce about 0.5 kg of the $H_2$ per hour. A larger surface area metal placed in the second polar electrolyte solution will produce more hydrogen. Metals placed in the second polar electrolyte solution to produce suitable metal ions may be provided as sheets such as Aluminum sheets, folded over or serpentine in shape may also be provided. Other forms of Aluminum solid include powders such as in a slurry, or nano structures. The hydrogen may be stored for future use, such as under compressed conditions. Examples of uses of hydrogen includes fuel cells. Such fuel cells may be used to power vehicles, for instance.

In some embodiments of the disclosure, the current may be boosted or "super charged" by the addition of oxidant to the second polar electrolyte solution. For example, in electrochemical cells where aluminum is disposed with an alcohol or aqueous solution, sodium peroxydisulfate may be added to the alcohol solution to boost the current observed from the electrochemical cell. In still other embodiments, a second polar electrolyte solution is not needed to create such boosted current. In electrochemical batteries of the disclosure, it may be useful to stack more than one electrochemical cell. The stacking of cells may be enabled, for example, by the use of three or more immiscible fluids having three or more different densities. In such embodiments, a second cathode opposite the first cathode at a second distance from the anode is provided and a third electrolyte solution in contact with the second cathode and the second electrolyte solution is further provided wherein the third and second electrolyte solutions are in contact with each other and are immiscible, and wherein there is no membrane in between the third and second electrolyte solutions. The third electrolyte solution may be polar and will be a greater density than the first two electrolyte solutions. An example of a third electrolyte solution that is denser than water is one that contains propylene carbonate as a solvent. The third electrolyte solution may contain a salt and may be saturated with respect to that salt. Batteries with such cells may be configured in flow or no flow mode.

Figure 4A:
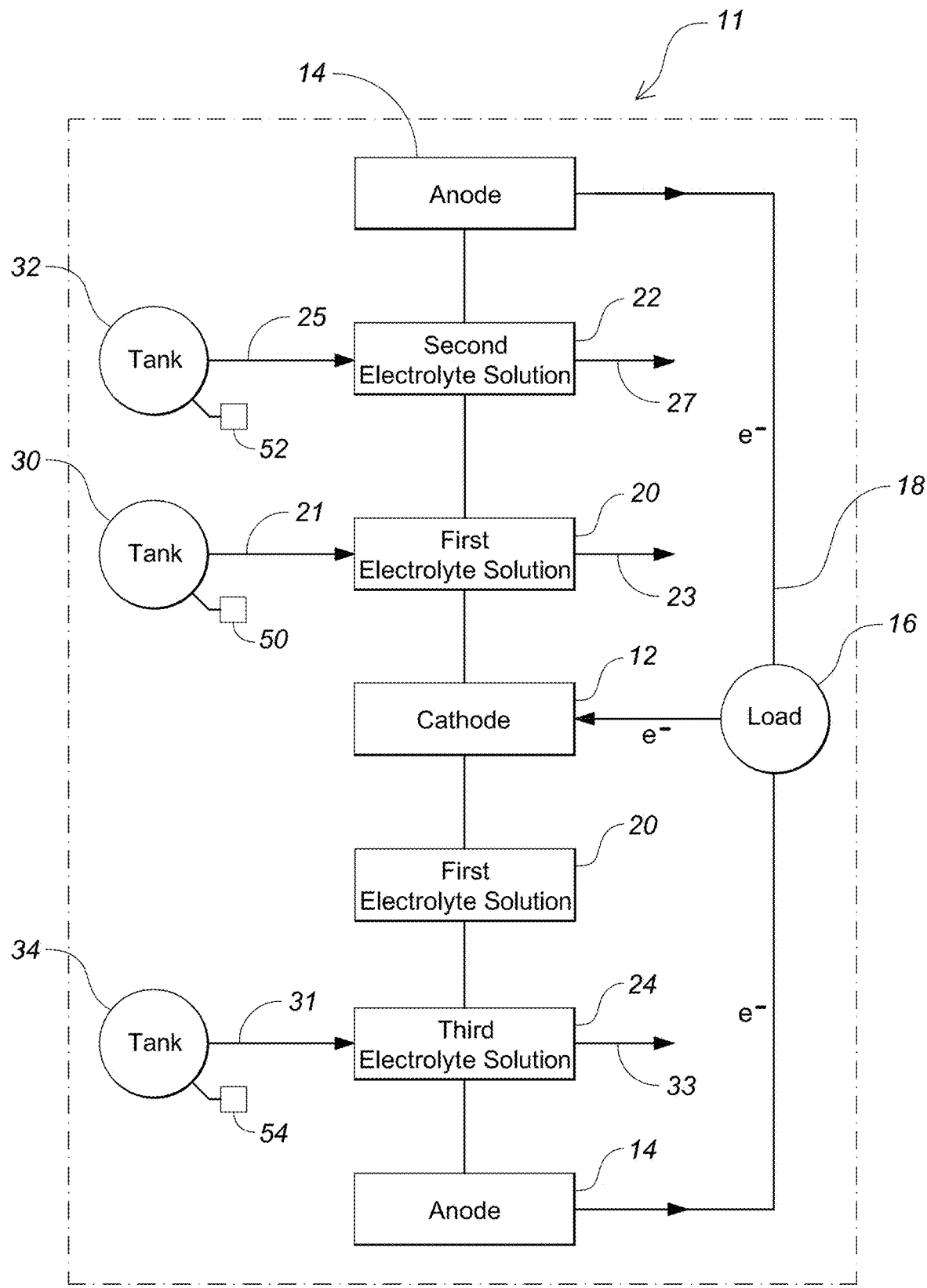
FIG. 4A is a schematic block diagram of an embodiment of an electrochemical cell according to the present disclosure.

In at least one embodiment according to the present disclosure, as shown in FIG. 4A, a battery may include a cell 11 including a first electrolyte solution 20, a second electrolyte solution 22, and a third electrolyte solution 24. In such an embodiment, the cell 11 includes one cathode 12 operating with two anodes 14 to generate electricity supplied to the load 16 via circuit 18. In such an embodiment, the third electrolyte solution 24 is denser than the first electrolyte solution 20 and the second electrolyte solution 22. The third electrolyte solution 24 is immiscible relative to the first electrolyte solution 20 and/or the second electrolyte solution 22. Accordingly, the second electrolyte solution 20 is disposed in a layer above the first electrolyte solution 22, and the first electrolyte solution 22 is disposed in a separate layer above the third electrolyte solution 24. Optional tanks 30 and 32, acting as sources for electrolyte solutions, and pumps 50 and 52 (or by capillarity, reverse osmosis, a ratchet, swelling pressure, or gravity), may be used to deliver electrolyte solutions to the cell in flow mode, for example via conduits 21 and 25 respectively. The first electrolyte solution 20 and second electrolyte solution 22 may further flow out of the cell 11 via conduits 23 and 27 respectively. They may be directed to waste or to other tanks. In some embodiments, flow could be reversed from said other tanks to recharge cell 11. In other embodiments, the cell can be arranged with a cathode on top and bottom and an anode in the middle.

As shown in FIG. 4A, the third electrolyte solution 24 may be supplied to the cell 11 from a third source 34 via conduit 31 with pump 54 (or by capillarity, reverse osmosis, a ratchet, swelling pressure, or gravity) which may be used in flow mode. The third electrolyte solution 24 may further flow out of cell 11 via conduit 33. This may be directed to waste or to another tank. In some embodiments, flow could be reversed from said another tank to recharge cell 11. In embodiments in which the third electrolyte solution 24 flows through the cell 11, the third electrolyte solution 24 may be directed to waste or to other tanks. In some embodiments, flow could be reversed and from the other tanks to recharge the cells. Alternatively, the third electrolyte solution 24 may not flow through the cell 11 but may be replaceable. Note that the vertical lines connecting the electrolyte solutions and the cathode and anode electrodes in the schematic are not conduits but are merely to aid in the viewing of the schematic.

Figure 4B:
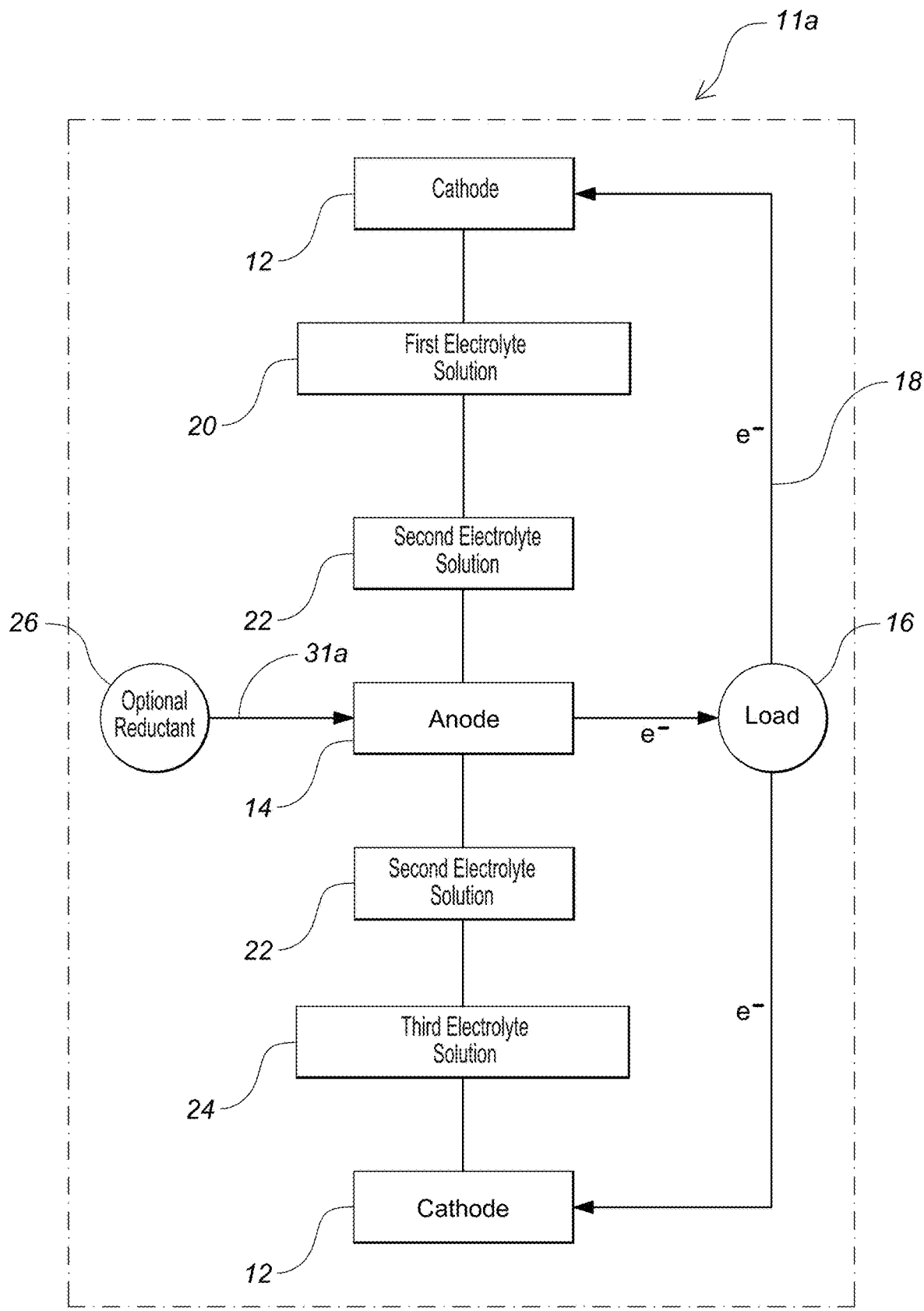
FIG. 4B is a schematic block diagram of an embodiment of an electrochemical cell according to the present disclosure.

In FIG. 4B, electrochemical cell 11$a$ is a three-layer system presented with two cathodes 12 and one anode 14. First electrolyte solution 20 is in contact with cathode 12 and second electrolyte solution 22 which in turn is in contact with anode 14 and third electrolyte solution 24. Cathode 12 is in contact with the third electrolyte solution 24 and load 16 via circuit 18. An optional reductant (such as $H_2$ gas) 26 may supply the $H_2$ to anode 14 via conduit 31$a$. Flow tanks, conduits, and pumps (or by capillarity, reverse osmosis, a ratchet, swelling pressure, or gravity) may be used to run electrochemical cell 11$a$ in flow mode and thus allow for recharging. Note that the vertical lines connecting the electrolyte solutions and the cathode and anode electrodes in the schematic are not conduits but are merely to aid in the viewing of the schematic.

In some embodiments, a first and second electrolyte solution are of different densities and immiscible due to the presence of a salt in the first electrolyte solution and are in contact without a membrane. Further, the cell is configured to run in a no flow mode. Batteries may be made of such cells such as in parallel or series geometry and/or a voltaic pile. The electricity from such batteries may be delivered to a process application such as solar farms, wind farms, household appliances, consumer goods, or toys.

EXAMPLE 1

Creating an Electrochemical Cell

Al Anode: A strip of aluminum screen which is 200 mm by 25 mm is cut and the screen is folded in half lengthwise three times, resulting in a 25 mm by 25 mm square 8 layers thick.

Carbon foam current collector: A strip of carbon felt which is 100 mm by 25 mm is cut. The carbon felt is folded in half lengthwise two times, resulting in a 25 mm by 25 mm square 4 layers thick.

Copper wire: A length of bare copper wire is cut which is about 100 mm long.

Assembly of copper wire and Al Anode: The piece of copper wire is slid through the middle of the aluminum screen, so there will be four layers on top of the copper and four layers below the copper. 10 mm on the end of the wire is bent so it partially wraps around resulting in copper wire, 4 layers aluminum, copper wire, and 4 layers aluminum. Once the wire is bent, the assembly is stapled together to avoid the wire falling out and to ensure good contact.

Assembly of copper wire and Carbon Foam Collector: The piece of copper wire is slid through the middle of the carbon foam, resulting in two layers on top of the copper and two layers below the copper. 10 mm on the end of the wire is bent so it partially wraps around the copper wire, 2 layers carbon foam, copper wire, and 2 layers of carbon foam. Once the wire is bent, the assembly is stapled together to avoid the wire falling out and to ensure good contact.

The overall assembly of aluminum, copper wire, and carbon foam is referred herein as a "unit".

EXAMPLE 2

Assembling Units Together

Cutting the porous, non-conductive spacer: A 35 mm by 35 mm piece of vinyl coated polyester screen is cut. This screen will act as a spacer to ensure that the aluminum anode of one unit will not touch the carbon foam collector of a separate unit, preventing a short in the battery.

Assembling two units together: A sandwich of the aluminum from a first unit, the spacer, and the carbon foam from a second unit is made. This sandwich is then wrapped in one layer of 3M surgical tape, which ensures that there is light compression of the sandwich construct so that the gap between the aluminum and carbon is the thickness of the spacer. The surgical tape also works as a sponge to absorb the electrolyte when so exposed to ensure adequate saturation of the battery. This sandwich may be referred to as a stack.

The assembly can be repeated for as many units as desired to create electrochemical cells in series. The ends of the cells can be connected via a common load to create an electrochemical battery. Upon exposure to electrolytes of the disclosure, electricity or hydrogen or both may be generated and may be delivered to an application.

EXAMPLE 3

Figure 5:
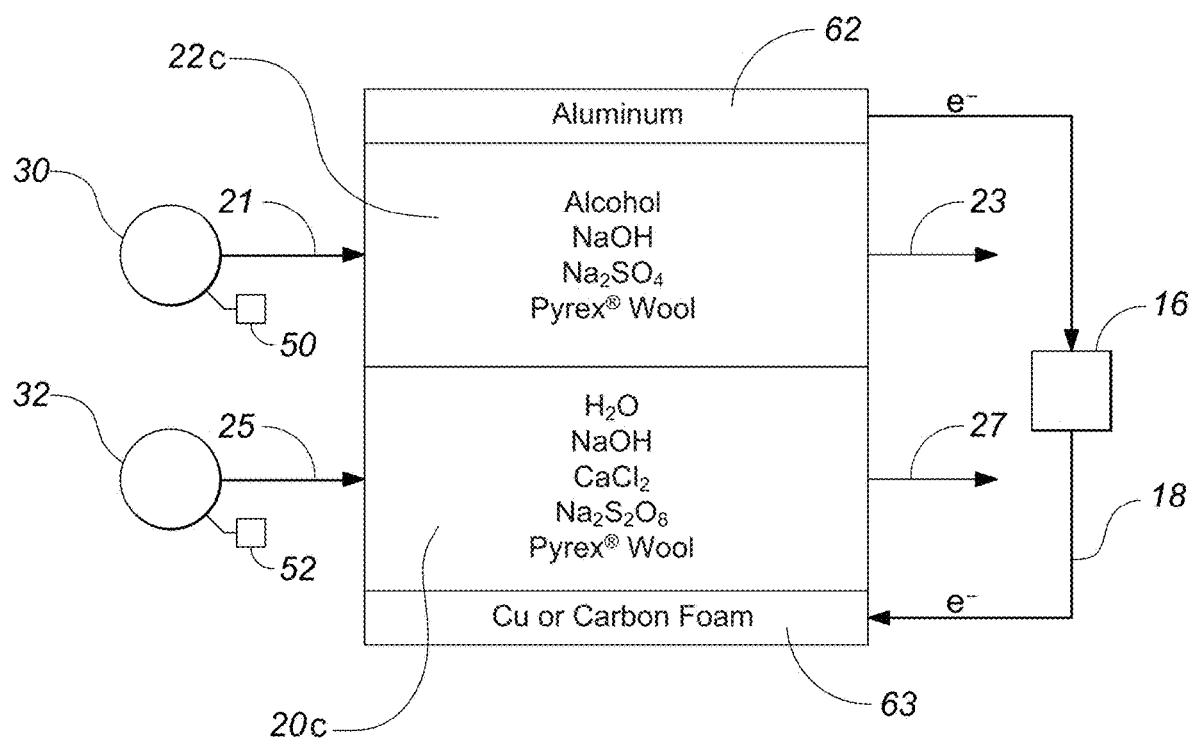
FIG. 5 is a schematic of an embodiment of an electrochemical cell of the disclosure.

Al/Peroxydisulfate Electrochemical Cell/Battery with Immiscible Electrolyte Solutions without a Membrane A no flow electrochemical cell/battery configured in accordance with the schematic of FIG. 5 (other than the flow portion of the schematic) was prepared. The figure represents both an electrochemical cell and a battery with a battery being defined as containing one or more electrochemical cells. The cell/battery was made in a glass beaker. Aluminum solid was used as anode 62 and electrically connected via circuit 18 and Load 16 to cathode 63, conducting carbon cloth or copper depending on the specific experiment. The anode was placed in an electrolyte solution 22c containing ethanol or methanol (multiple were tested), which was loaded with sodium sulfate and sodium hydroxide. The cathode was placed in contact with an electrolyte solution 20c and loaded with sodium hydroxide, calcium chloride, and $Na_2S_2O_8$. Although each solution is polar, the different electrolyte solutions are immiscible. Further, they have different densities with the peroxydisulfate solution being denser, and thus on the bottom and the less dense neutral alcohol (ethanol or methanol) solution on top. The anode electrode is aluminum. Pyrex® wool is loaded into the beaker in between the cathode and anode. The Pyrex® wool forms a porous medium in which fluids are imbedded. Other porous media materials, such as other borosilicates, may be used.

The concentrations of sodium and calcium salts were such that they were near or at their solubility limit for the system. The cell/battery of FIG. 5 could be run in flow mode by attaching optional tanks 30 and 32 and pumps 50 and 52 (or by capillarity, reverse osmosis, a ratchet, swelling pressure, or gravity) via conduits 21 and 25 respectively. The outflow from the cell/battery 23 and 27 could be routed to waste or to an external tank for recharge purposes via reversing polarity. In flow operation, the rate of addition of a fluid to increase or decrease the thickness of a layer can be used to change the pressure in the layer. The anode oxidation reaction rate, such as $Al(s) \rightarrow Al^{3+}$, can be controlled by adjusting the two pressures in electrolyte solutions (by adjusting the rate which controls the thickness of the two solutions) which in turn changes the proximity of the aluminum to the ions in the cathode solution such as, for example, the $S_2O_8^{2-}$ ion).

EXAMPLE 4

Figure 6:
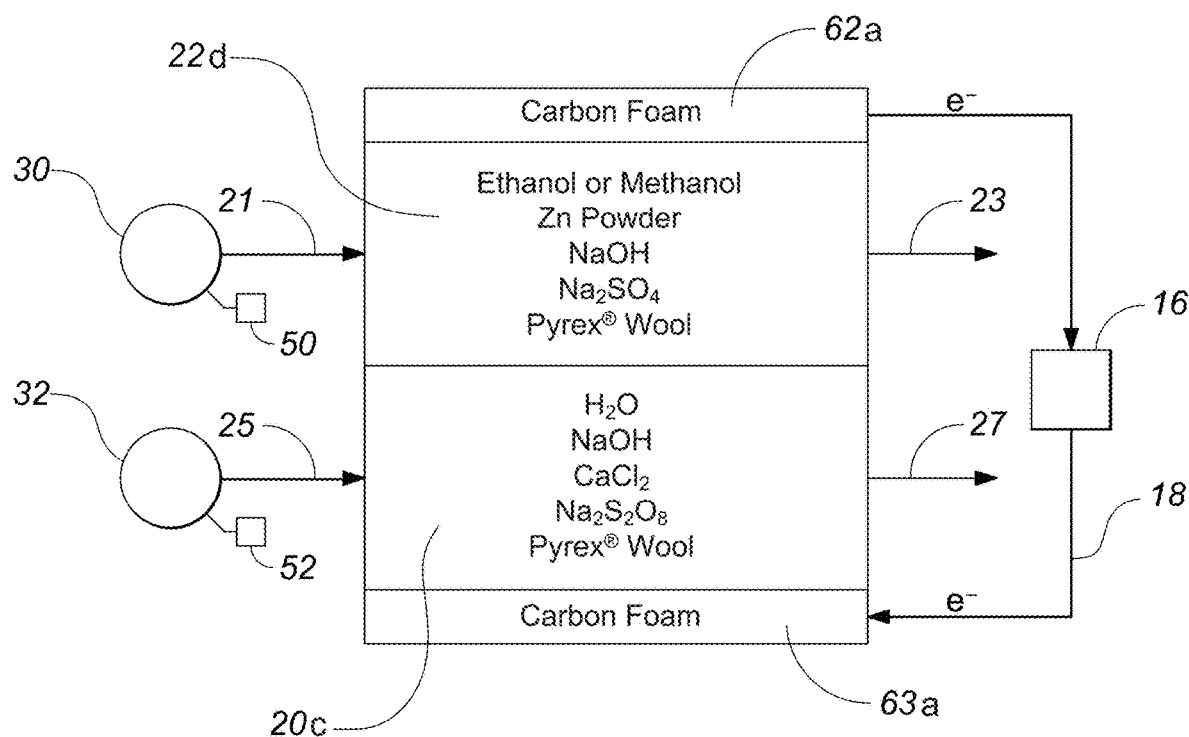
FIG. 6 is a schematic of an embodiment of an electrochemical cell of the disclosure.

Zn/Peroxydisulfate Electrochemical Cell/Battery with Immiscible Electrolyte Solutions without a Membrane A no flow electrochemical cell/battery configured in accordance with the schematic of FIG. 6 (other than the flow portion of the schematic) was prepared. The figure represents both an electrochemical cell and a battery with a battery being defined as containing one or more electrochemical cells. The cell/battery was made in a glass beaker. Carbon foam was used as an anode-electrode 62a and electrically connected via circuit 18 and Load 16 to cathode 63a, which was also carbon foam. The anode was placed in an electrolyte solution 22d containing ethanol or methanol depending on the experiment (multiple runs were performed), which was loaded with zinc powder, sodium sulfate and sodium hydroxide. The cathode was placed in contact with an electrolyte solution 20c in water and loaded with sodium hydroxide, calcium chloride, and $Na_2S_2O_8$. Although each solution is polar, the different electrolyte solutions are immiscible. Further, they have different densities with the peroxydisulfate solution being denser, and thus on the bottom and the less dense neutral alcohol (ethanol or methanol) solution on top. Pyrex® wool was loaded into the beaker in between the cathode and anode. The Pyrex® wool forms a porous medium in which fluids are imbedded. Other porous media materials, such as other borosilicates, may be used.

The concentrations of sodium and calcium salts were such that they were near or at their solubility limit for the system. The cell/battery of FIG. 6 could be run in flow mode by attaching optional tanks 30 and 32 and pumps 50 and 52 (or by capillarity, reverse osmosis, a ratchet, swelling pressure, or gravity) via conduits 21 and 25 respectively. The outflow from the cell/battery 23 and 27 could be routed to waste or to an external tank for recharge purposes via reversing polarity. After running for three hours, voltages of between 1.75V and 1.89 V were recorded and a current of 0.12 A/cm² were recorded at one ohm in ethanol and about 1.52V at 0.12 A/cm² in methanol.

In flow operation, the rate of addition of a fluid to increase or decrease the thickness of a layer can be used to change the pressure in the layer. The anode oxidation reaction rate, such as $Zn(s) \rightarrow Zn^{2+}$, can be controlled by adjusting the two pressures in electrolyte solutions (by adjusting the rate which controls the thickness of the two solutions) which in turn changes the proximity of the zinc to the ions in the cathode solution such as, for example, the $S_2O_8^{2-}$ ion. The reaction may also be reversible so that the cell or a battery with multiple cells may be recharged.

EXAMPLE 5

Figure 7:
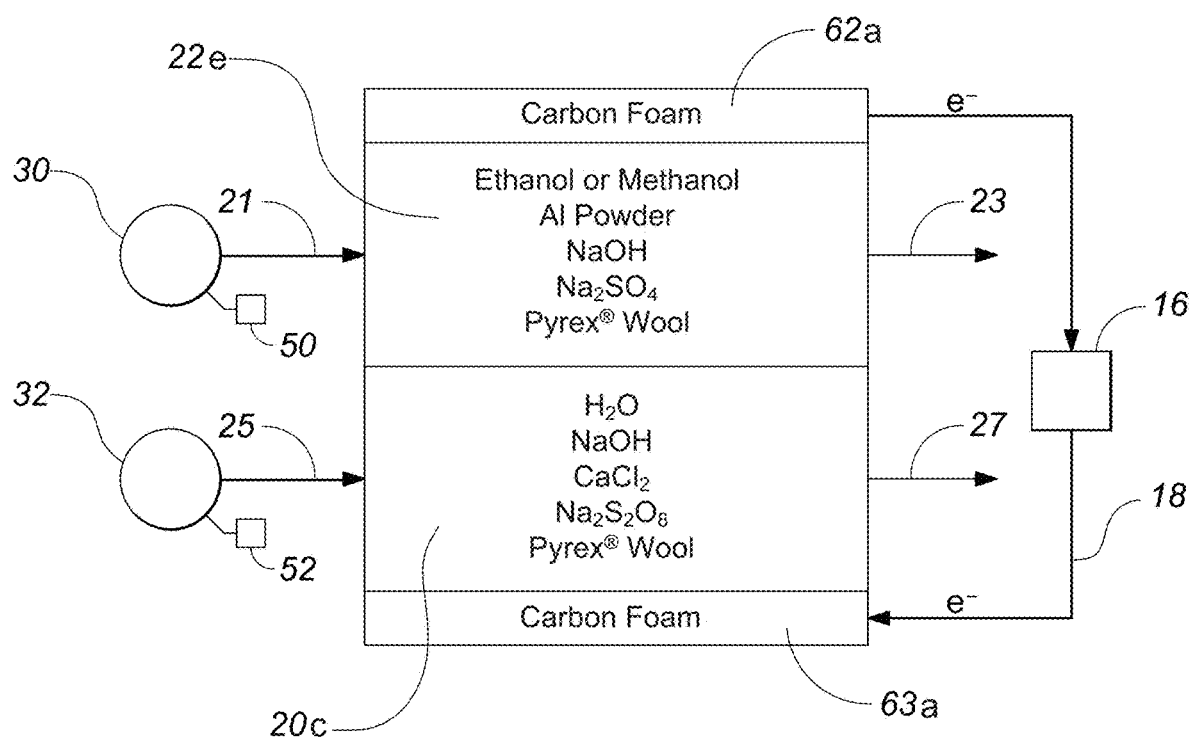
FIG. 7 is a schematic of an embodiment of an electrochemical cell of the disclosure.

Additional Embodiment of Al/Peroxydisulfate Electrochemical Cell/Battery with Immiscible Electrolyte Solutions without a Membrane A no flow electrochemical cell/battery configured in accordance with the schematic of FIG. 7 (other than the flow portion of the schematic) was prepared. The figure represents both an electrochemical cell and a battery with a battery being defined as containing one or more electrochemical cells. The cell/battery was made in a glass beaker. Carbon foam was used as an anode-electrode 62a and electrically connected via circuit 18 and Load 16 to cathode 63a, which was also carbon foam. The anode was placed in an electrolyte solution 22e containing ethanol or methanol depending on the experiment (multiple runs were performed), which was loaded with aluminum powder, sodium sulfate and sodium hydroxide. The cathode was placed in contact with an electrolyte water solution 20c and loaded with sodium hydroxide, calcium chloride, and $Na_2S_2O_8$. Although each solution is polar, the different electrolyte solutions are immiscible. Further, they have different densities with the peroxydisulfate solution being denser, and thus on the bottom and the less dense neutral alcohol (ethanol or methanol) solution on top. Pyrex® wool is loaded into the beaker in between the cathode and anode. The Pyrex® wool forms a porous medium in which fluids are imbedded. Other porous media materials, such as other borosilicates, may be used.

The concentrations of sodium and calcium salts were such that they were near or at their solubility limit for the system. The cell/battery of FIG. 7 could be run in flow mode by attaching optional tanks 30 and 32 and pumps 50 and 52 (or by capillarity, reverse osmosis, a ratchet, swelling pressure, or gravity) via conduits 21 and 25 respectively. The outflow from the cell/battery 23 and 27 could be routed to waste or to an external tank for recharge purposes via reversing polarity. After running for three hours, a voltage of 1.9 V was recorded and a current of 0.14 A/cm².

In flow operation, the rate of addition of a fluid to increase or decrease the thickness of a layer can be used to change the pressure in the layer. The anode oxidation reaction rate, such as $Al(s) \rightarrow Al^{3+}$, can be controlled by adjusting the two pressures in electrolyte solutions (by adjusting the rate which controls the thickness of the two solutions) which in turn changes the proximity of the aluminum to the ions in the cathode solution such as, for example, the $S_2O_8^{2-}$ ion).

EXAMPLE 6

Al/Peroxydisulfate Flow Battery and Hydrogen Production

Figure 8:
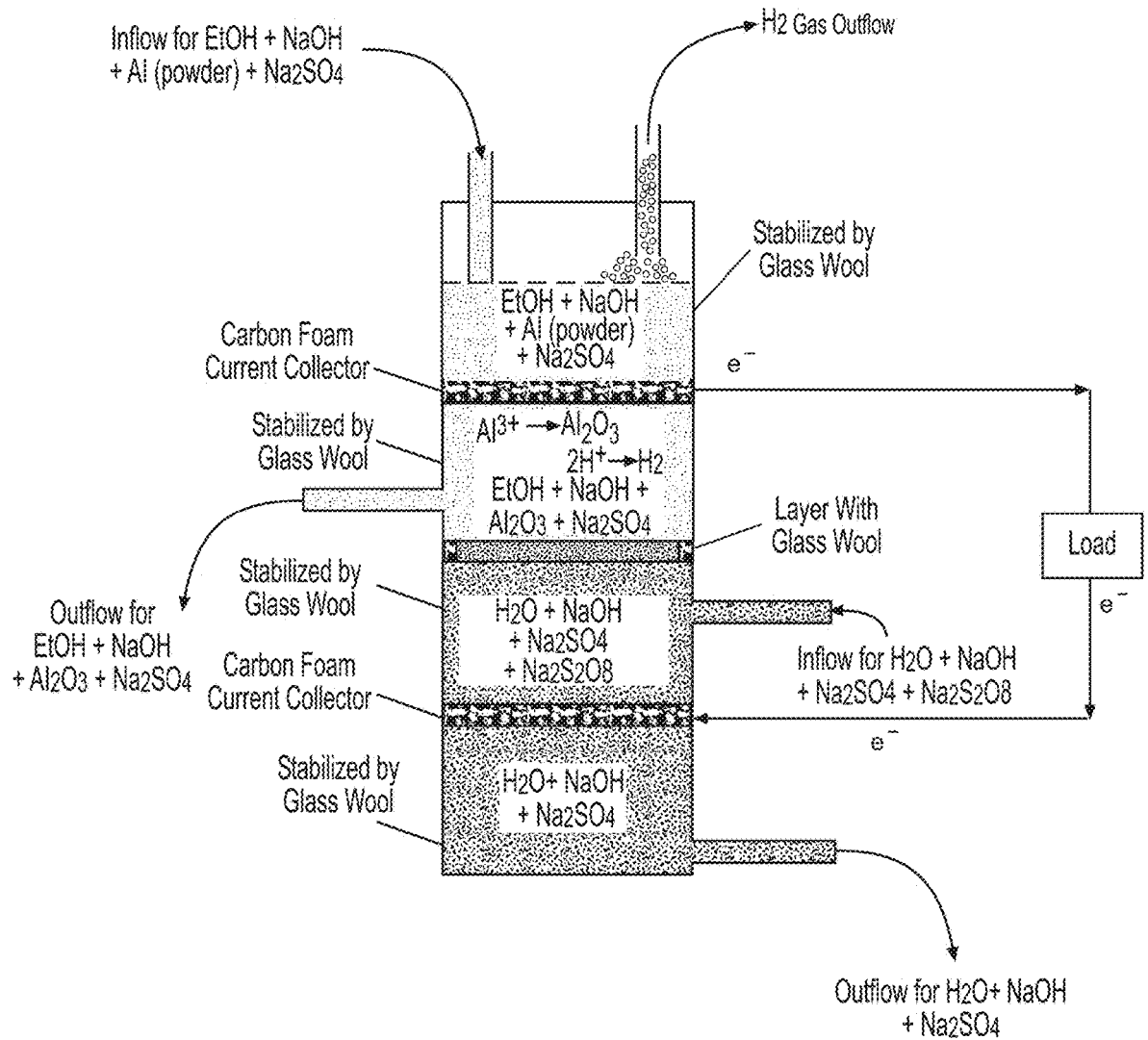
FIG. 8 is a schematic of an embodiment of an electrochemical cell of the disclosure in flow mode.

FIG. 8 is a schematic of an electrochemical cell in flow mode. Flow batteries have the advantage that they are instantly rechargeable via continual replacement of the electrolytes. In many ways flow batteries are like fuel cells, but rather than using hydrogen and oxygen, they employ liquid electrolytes. The metal that is often on the anode side of redox flow-batteries is in the form of a very fine powder that is premixed with the analyte to form a colloidal suspension and pumped through a porous carbon current collector where oxidation takes place. On the cathode side a strong oxidant is dissolved in the catholyte for the reduction step. Example single cell amperages range from 0.25 A/cm$^2$ to 0.1 A/cm$^2$ with voltages ranging from 1.5V to 3.25V. A first electrolyte solution is made by loading water with NaOH, Na$_2$SO$_4$ and Na$_2$S$_2$O$_8$. Inflow and outflow ports are provided so that electrolyte solution can be replenished and removed for flow purposes. The first electrolyte solution uses a carbon foam current collector and is stabilized with glass wool. Inflowing solution contains water, NaOH, Na$_2$SO$_4$, and Na$_2$S$_2$O$_8$ whereas outflow is water, NaOH, and Na$_2$SO$_4$. A material, often made of plastic, with holes may be used to separate the first electrolyte solution from the second and may contain glass wool.

A second electrolyte is made by adding NaOH, Al powder and Na$_2$SO$_4$ to ethanol. The Na$_2$SO$_4$ is added at a sufficiently high concentration to keep separate the aqueous first electrolyte solution from the ethanolic second electrolyte solution. Inflows and outflows are provided for the second electrolyte solution with an inflow being an ethanolic solution of NaOH and Na$_2$SO$_4$ with added Al in powder form. The outflow contains ethanol, sodium hydroxide, Al$_2$O$_3$, Na$_2$SO$_4$, and NaAl(OH)$_4$. The current collector is carbon foam which is in electrical contact via a load with the current collector of the first electrolyte solution. Glass wool stabilizes the second electrolyte solution. During the electrochemical process hydrogen gas is formed in the second electrolyte solution and may be removed as set forth in FIG. 8 to, for example, a hydrogen compressor, for hydrogen delivery to a process application such as a fuel cell. The electricity generated by the electrochemical cell may be used to power the hydrogen compressor. For example, a 900 cm$^2$ Aluminum sheet placed in the second electrolyte solution should provide current of at least 0.1 A/cm$^2$ resulting in 90 A of current, at 1 ohm and 2 volts, this provides 180 watts of power. Thus, 6 electrochemical cells in series would be more than sufficient to run a typical hydrogen compressor.

Thus, on the anode side (ethanol), solid aluminum produces electrons and on the cathode side a strong oxidant (like $S_2O_8^{2-}$ or ClO$^-$) accepts electrons. The Al(s)→Al$^{3+}$+ 3e$^-$ and the $S_2O_8^{2-}$→$2SO_4^{2-}$ half reactions yield a substantial current (1.4 A/cm$^2$-anode) which can be used to drive a compressor. Without being bound by theory, if these reactions are carried out in a basic environment, then there are three other very important reactions on the anode side that take place which also lead to the oxidation of aluminum and the resulting production of hydrogen gas.

EXAMPLE 7

Electrochemical Cell with Single Solution which May be Used as a Capacitor

An electrochemical cell was prepared in accordance with FIG. 9 in a no-flow mode. The cell could be run in flow mode, however, and FIG. 9 illustrates how that could be done.

An electrolyte solution was made from 10 grams of sodium peroxydisulfate, 10 grams of sodium hydroxide, 10 grams of sodium sulfate and 200 mls of water. Within an electrochemical cell, 1.5 grams of Al foil was compressed into a 1×2×1 cm block and connected via copper wire to a meter in the cell and 20 mls of the electrolyte solution was added to the cell. A carbon foam current collector was also connected to the meter in the cell. Electrochemical cell 20*d*, therefore, is similar to 20*c*, except for the addition of sodium sulfate. Over the course of about 45 minutes, concentrated (2M) sodium peroxydisulfate and NaOH (pH15) was added dropwise to the cell near the Al foil. Drops were added so that the current provided by the cell ranged between about 400 and 600 milliwatts until a total of about 20 ml were added. Subsequently, a small amount of solid sodium peroxydisulfate was added near the anode and it was observed that the power spiked to 750 milliwatts and then reached a steady state of 600 milliwatts for about 10 minutes. The addition of solid peroxydisulfate also caused the release of heat and substantial hydrogen gas.

Spikes in power may be obtained by adding oxidant, such as with the addition of sodium peroxydisulfate and sodium hydroxide followed by opening the electrochemical circuit such as by disconnecting the lead. The disconnection may be used to build a capacitor. The capacitor charge may then be discharged by reconnecting the lead and closing the circuit. It is believed that reduction-oxidation capacitance is charged chemically by continuous oxidation of the aluminum while the circuit is open creating a net negative charge on the aluminum, which in turn induces a double ionic layer (sodium and sulfate) to form next to the aluminum surface with cations favored toward the surface. Subsequent closing the circuit causes the anode to rapidly discharge through the load, with the coincident breakdown of the double layer, creating what is commonly known as a capacitor. Rapidly cycling an open and closed circuit can create a large and sustainable current. This capacitor is self-charging and can be controlled by the amount of oxidant deployed and pH.

This cycle, of opening and closing the circuit may be repeated at the same time that bulk electrolyte and solid aluminum is passed through the system. Alternatively, the resulting sodium sulfate, aluminum oxide and sodium aluminate may be removed.

EXAMPLE 8

A Battery-Powered Vehicle

Figure 10:
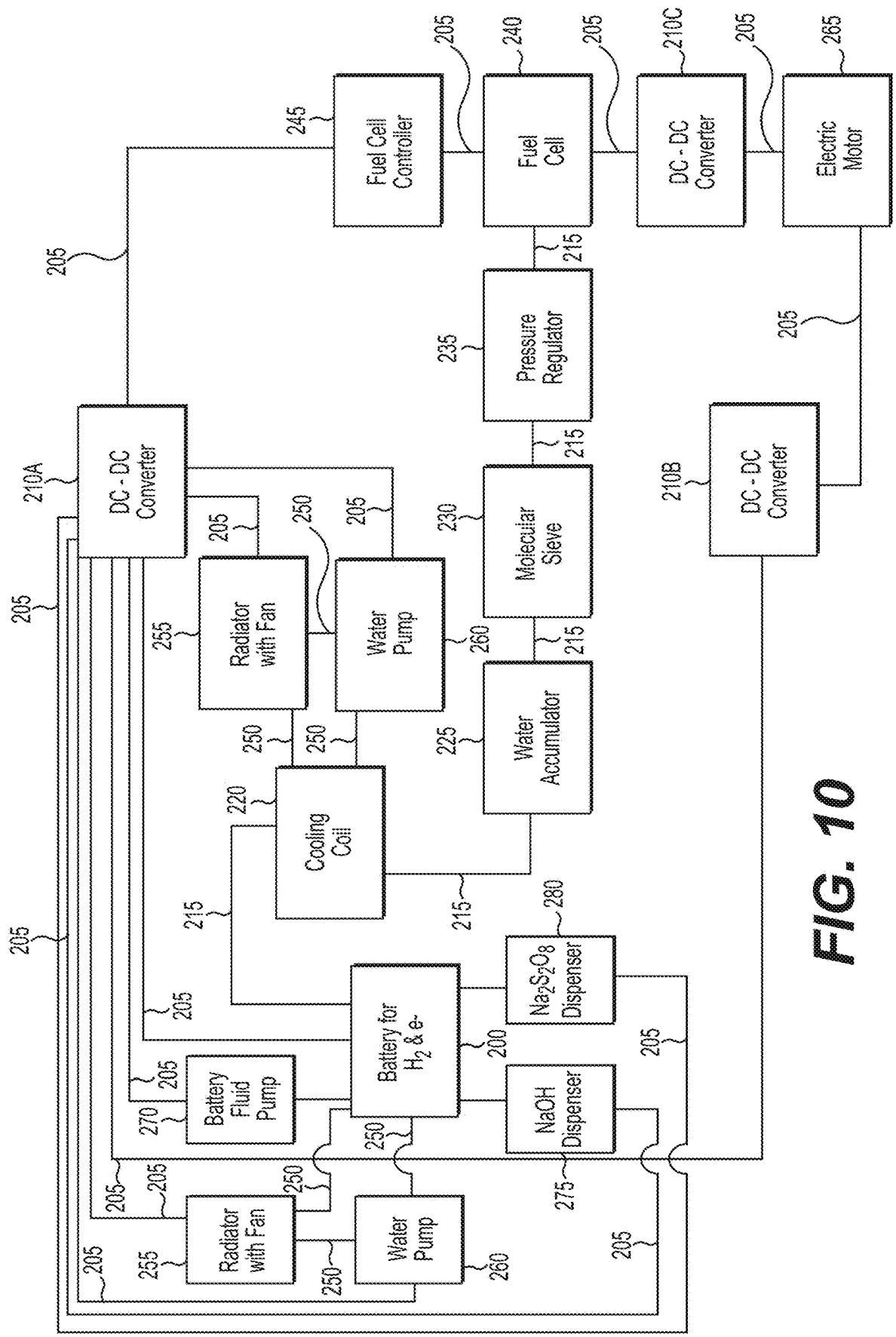
FIG. 10 is a schematic of a vehicle battery system of the disclosure.

A fuel-cell powered vehicle (Drive Medical Spitfire Scout 4 wheel scooter) is reconfigured to be powered by a battery of Example 9 by manually replacing the installed-battery with the battery and system as set forth in this Example 8. As illustrated in FIG. 10, a battery of Example 9, 200, is placed in the vehicle and connected via electrical connection 205 to a DC-DC converter 210A, which was electrically connected to fuel cell controller 245. All electrical connections between the provided components are provided as 205. The controller is a small computer which controls the fuel cell values, the cooling system, and other components of the fuel cell. One function of the controller is to control the temperature of the fuel cell via a cooling system (not shown) inside 240. The amount of hydrogen let into the fuel cell is controlled by valves connected to or within the fuel cell. The fuel cell controller is in electrical contact with the fuel cell.

Hydrogen from Battery 200 is dried prior to entering fuel cell 240. Here, hydrogen from IFBattery 200 is delivered via hydrogen gas line 215 to cooling coil 220 which is in fluid contact with water pump 260 via 250 and radiator/fan 255 via. Electricity from battery 200 through DC-DC converter 210A may be used to power both the radiator/fan 255 and water pump 260. All hydrogen gas lines between listed components are listed as 215. The cooled hydrogen is transferred via gas line over a water accumulator 255 and through molecular sieve 230 via a gas line and pressure regulator 235 via a gas line for delivery to fuel cell 240 via a gas line.

Fuel cell 240 converts hydrogen to electricity for delivery to DC-DC converter 210C for delivery to electric motor 265 for use in powering the vehicle. Optional DC-DC converter 210B may be used to power electric motor 265 also or in lieu of a fuel cell.

Battery 200 may be positioned within a system as described below. In such as system, bulk battery fluid can be stored at the bottom of a tank, then transported to a fluid manifold via a pump. The fluid can then flow through to one or more series of cells of the disclosure, and then to a fluid outlet where the flow rate is controlled. The fluid may cycle from the battery fluid tank, to the pump, to the fluid manifold, through the cells, to the fluid outlet, and return to the battery fluid tank. This cycle can repeat for as long as the battery is running. In the battery fluid tank, electrolyte components such as NaOH and $Na_2S_2O_8$ can be added to maintain a steady concentration. A radiator may also be added to keep temperature to a specified range, for example within 40-80C.

Electric wires can all be connected at a central port. Hydrogen is released at $H_2$ ports and may go into the hydrogen purification stream on the block diagram.

The block diagram includes a battery fluid pump 270, NaOH dispenser 275, $Na_2S_2O_8$ dispenser 280, and another water pump 260/radiator 255 combination which will maintain the temperature of the battery pack. These can all be powered with the DC-DC converter (210A) which utilizes electrical power from the battery. The NaOH 275 and $Na_2S_2O_8$ 280 dispensers are used to add more of each chemical into the battery fluid tank to either maintain the concentration as the chemicals are used up, or to increase the concentrations. The battery fluid pump takes fluid from the tank to the fluid manifold. The fluid flow is used in the context of a flow battery.

In the various descriptions above, electrochemical cells are stacked vertically. In alternative embodiments, adjacent electrochemical cells, for example, may be disposed in other orientations to make batteries.

EXAMPLE 9

Battery

The electrochemical cells in Example 8 were prepared by making electrochemical cells as described in this Example 9. Each cell was constructed as follows: 10 g of Al were used as anodes and were placed in containers of ABS plastic, a carbon foam was used as a cathode current collector, and a vinyl coated polyester was used as a separator to separate the aluminum and carbon foam. Then each battery cell was filled with approximately 30 mL of 2M NaOH, 1/6M $Na_2S_2O_8$, 1/6M $Na_2SO_4$. The battery cells were connected so that 6 battery cells were in series, and then 3 sets of 6 batteries in series were connected in parallel. The connections between cells, as well as the parallel connections were made with tin coated copper wire.

A variety of embodiments according to the present disclosure are contemplated. Such embodiments may be employed in a variety of methods, processes, procedures, steps, and operations as a means of providing electrochemical cells and batteries. While the disclosure has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this disclosure. Accordingly, all such modifications are intended to be included within the scope of this disclosure as defined in the following claims. Indeed, this disclosure is not intended to be exhaustive or to limit the scope of the disclosure.

An additional list of non-limiting embodiments of this disclosure is provided below in the form of clauses.

Clause 1. An electrochemical cell comprising:
  a. an anode;
  b. a cathode current collector; and
  c. a porous, non-conductive spacer between the cathode current collector and anode.

Clause 2. The electrochemical cell of Clause 1, further comprising a single electrolyte solution.

Clause 3. The electrochemical cell of Clause 2, wherein the cell is saturated with electrolyte.

Clause 4. The electrochemical cell of Clause 3, wherein the cell is not immersed in an electrolyte bath.

Clause 5. The electrochemical cell of Clause 1, wherein the cell is wrapped in a microporous material.

Clause 6. The electrochemical cell of Clause 1, wherein the anode is selected from aluminum, gallium, indium, thallium and alloys comprising at least one of these.

Clause 7. The electrochemical cell of Clause 6, wherein the anode is aluminum.

Clause 8. The electrochemical cell of Clause 1, wherein the cathode current collector is selected from steel, the graphite allotrope of carbon, carbon impregnated with a metal and carbon foam.

Clause 9. The electrochemical cell of Clause 8, wherein the cathode current collector is carbon foam.

Clause 10. The electrochemical cell of Clause 1, wherein the porous, non-conductive spacer is selected from an organic polymer, surgical tape, fiberglass film, glass wool, wood, paper, cloth, cardboard and nylon.

Clause 11. The electrochemical cell of Clause 10, wherein the spacer is vinyl coated polyester.

Clause 12. The electrochemical cell of Clause 2, wherein the electrolyte comprises water and one or more salts.

Clause 13. The electrochemical cell of Clause 12, wherein at least one salt is an oxidant.

Clause 14. The electrochemical cell of Clause 12, wherein the electrolyte comprises two salts.

Clause 15. The electrochemical cell of Clause 14, wherein the electrolyte comprises a salt of peroxydisulfate and a salt of sulfate and further comprises a base.

Clause 16. The electrochemical cell of Clause 15, wherein the peroxydisulfate salt is sodium peroxydisulfate and the sulfate salt is sodium sulfate and the base is sodium hydroxide.

Clause 17. The electrochemical cell of Clause 2, wherein the electrolyte comprises one of water or an alcohol.

Clause 18. The electrochemical cell of Clause 17, wherein the electrolyte is a catholyte.

Clause 19. The electrochemical cell of Clause 17, further comprising an oxidant.

Clause 20. The electrochemical cell of Clause 19, further comprising a metal salt.

Clause 21. The electrochemical cell of Clause 20, wherein the oxidant and metal salt have different anion components.

Clause 22. The electrochemical cell of Clause 21, wherein the oxidant is sodium peroxydisulfate and the metal salt is sodium sulfate.

Clause 23. The electrochemical cell of Clause 17, further comprising a base.

Clause 24. The electrochemical cell of Clause 23, wherein the base is NaOH.

Clause 25. An electrochemical cell of any one of Clauses 1-24, wherein the cell is electrically connected to a load.

Clause 26. An electrochemical battery comprising one or more electrochemical cells of any one of Clauses 1-24, wherein the battery is electrically connected to a load.

Clause 27. A method which comprises producing electricity or hydrogen with an electrochemical cell of Clause 25 and delivering the electricity to an application.

Clause 28. A method which comprises producing electricity or hydrogen with an electrochemical battery of Clause 26 and delivering the electricity or hydrogen to an application.

Clause 29. A method of making an electrochemical cell, which comprises:
1) providing an electrochemical cell of any one of Clauses 1 and 5-11, wherein the electrochemical cell does not comprise an electrolyte; and
2) contacting the cell with a single electrolyte solution.

Clause 30. The method of Clause 29, which comprises contacting the cell with the single electrolyte solution by spraying the electrolyte solution onto the cell.

Clause 31. The method of Clause 29, which comprises contacting the cell with droplets of the single electrolyte solution via drip.

Clause 32. The method of Clause 29, which comprises contacting the cell with an atomized mist of the single electrolyte solution.

Clause 33. A method of operating an electrochemical cell, which comprises:
1) providing an electrochemical cell of Clause 1, wherein the electrochemical cell further comprises a single electrolyte solution;
2) electrically connecting the electrochemical cell to a load such that the electrochemical cell operates to produce electricity, hydrogen, or both electricity and hydrogen; and
3) providing additional electrolyte solution, or one or more components thereof, to the cell during its operation.

Clause 34. The method of Clause 33, which further comprises:
4) withdrawing spent electrolyte solution, or one or more components thereof, from the electrochemical cell during its operation.

Clause 35. The method of Clause 34, which comprises 4) withdrawing spent electrolyte solution, or one or more components thereof, simultaneously with 3) providing additional electrolyte solution, or one or more components thereof.

Clause 36. The method of any one of Clauses 33-35, wherein the single electrolyte solution comprises one or more of the following components: solvent, oxidant, metal salt, and base.

Clause 37. A method of creating a capacitor, which comprises disconnecting a load from the cathode current collector or anode side of the electrochemical cell of any one of Clauses 1-25.

Clause 38. The method of Clause 37, further comprising the step of reconnecting the load.

Clause 39. A capacitor prepared by the process of alternately disconnecting and reconnecting a load from at least one of the cathode current collector or anode in an electrochemical cell of any one of Clauses 1-25.

Clause 40. The electrochemical cell of any one of Clauses 1-4, wherein the cell is wrapped in a microporous material.

Clause 41. The electrochemical cell of any one of Clauses 1-4 and 40, wherein the anode is selected from aluminum, gallium, indium, thallium and alloys comprising at least one of these.

Clause 42. The electrochemical cell of Clause 41, wherein the anode is aluminum.

Clause 43. The electrochemical cell of Clause 42, wherein the aluminum is in the form of a screen.

Clause 44. The electrochemical cell of Clause 43, wherein the aluminum thickness in the screen is between about 0.1 mm and about 0.3 mm.

Clause 45. The electrochemical cell of any one of Clauses 1-4 and 40-44, wherein the cathode current collector is carbon foam.

Clause 46. The electrochemical cell of any one of Clauses 1-4 and 40-45, wherein the porous, non-conductive spacer is selected from an organic polymer, surgical tape, fiberglass film, glass wool, wood, paper, cloth, cardboard and nylon.

Clause 47. The electrochemical cell of Clause 46, wherein the spacer is vinyl coated polyester.

Clause 48. The electrochemical cell of Clause 46, wherein the spacer is a screen.

Clause 49. The electrochemical cell of Clause 48, wherein the spacer thickness in the screen is between about 0.1 mm and about 0.8 mm and the spacer is vinyl coated polyester.

Clause 50. The electrochemical cell of Clause 1, further comprising a metal conductor between the anode and an adjacent cathode current collector from a second electrochemical cell and wherein the electrochemical cell of Clause 1 is configured to operate as a flow cell.

Clause 51. The electrochemical cell of Clause 50, wherein the metal conductor is copper wire.

Clause 52. The electrochemical cell of any one of Clauses 40-51, wherein the microporous material is surgical tape.

Clause 53. The electrochemical cell of any one of Clauses 2-4 and 40-52, wherein the electrolyte comprises water and one or more salts, wherein at least one of the salts is an oxidant.

Clause 54. The electrochemical cell of Clause 53, wherein the electrolyte comprises two salts.

Clause 55. The electrochemical cell of Clause 54, wherein the electrolyte comprises a salt of peroxydisulfate and a salt of sulfate and further comprises a base.

Clause 56. The electrochemical cell of Clause 55, wherein the peroxydisulfate salt is sodium peroxydisulfate and the sulfate salt is sodium sulfate and the base is sodium hydroxide.

Clause 57. An electrochemical battery comprising one or more electrochemical cells of any one of Clauses 1-4 and 40-56, wherein the battery is electrically connected to a load.

Clause 58. The electrochemical battery of Clause 57, comprising two or more electrochemical cells arranged in series.

Clause 59. The electrochemical battery of Clause 57, comprising two or more electrochemical cells arranged in parallel.

Clause 60. The electrochemical battery of Clause 57, comprising electrochemical cells arranged in series and in parallel.

Clause 61. The electrochemical battery of any one of Clauses 57-60, further comprising an electrolyte wherein the electrolyte comprises water and one or more salts, wherein at least one of the salts is an oxidant.

Clause 62. The electrochemical battery of Clause 61, wherein the electrolyte comprises two salts.

Clause 63. The electrochemical battery of Clause 62, wherein the electrolyte comprises a salt of peroxydisulfate and a salt of sulfate and further comprises a base and wherein the electrochemical battery is configured as a flow battery.

Clause 64. The electrochemical battery of Clause 63, wherein the peroxydisulfate salt is sodium peroxydisulfate and the sulfate salt is sodium sulfate and the base is sodium hydroxide.

Clause 65. The electrochemical battery of any one of Clauses 57-64, which produces electricity.

Clause 66. The electrochemical battery of any one of Clauses 57-64, which produces hydrogen.

Clause 67. The electrochemical battery of any one of Clauses 57-64, which produces electricity and hydrogen.

Clause 68. A method which comprises delivering electricity produced by the electrochemical battery of Clause 65 to an application.

Clause 69. A method which comprises delivering hydrogen produced by the electrochemical battery of Clause 66 to an application.

Clause 70. The method of Clause 68, wherein the application is a cell phone tower or a vehicle.

Clause 71. The method of Clause 69, wherein the application is a fuel cell or a vehicle.

Clause 72. The electrochemical cell of any one of Clauses 2-4 and 40-56, wherein the electrolyte comprises one of water or an alcohol.

Clause 73. The electrochemical cell of Clause 72, wherein the electrolyte is a catholyte.

Clause 74. The electrochemical cell of Clause 72 or 73, further comprising an oxidant.

Clause 75. The electrochemical cell of Clause 74, further comprising a metal salt.

Clause 76. The electrochemical cell of Clause 75, wherein the oxidant and metal salt have different anion components.

Clause 77. The electrochemical cell of Clause 76, wherein the oxidant is sodium peroxydisulfate and the metal salt is sodium sulfate.

Clause 78. The electrochemical cell of any one of Clauses 72-77, further comprising a base.

Clause 79. The electrochemical cell of Clause 78, wherein the base is NaOH.

Clause 80. The electrochemical battery of any one of Clauses 57-60, further comprising an electrolyte wherein the electrolyte comprises one of water or an alcohol.

Clause 81. The electrochemical battery of Clause 80, wherein the electrolyte is a catholyte.

Clause 82. The electrochemical battery of Clause 80 or 81, further comprising an oxidant.

Clause 83. The electrochemical battery of Clause 82, further comprising a metal salt.

Clause 84. The electrochemical battery of Clause 83, wherein the oxidant and metal salt have different anion components.

Clause 85. The electrochemical battery of Clause 84, wherein the oxidant is sodium peroxydisulfate and the metal salt is sodium sulfate.

Clause 86. The electrochemical battery of any one of Clauses 80-85 further comprising a base.

Clause 87. The electrochemical battery of Clause 86, wherein the base is NaOH.

Clause 88. An electrochemical cell comprising:
 a) an anode;
 b) a cathode current collector; and
 c) a porous, non-conductive spacer between the cathode current collector and anode; wherein the electrochemical cell does not comprise an electrolyte.

Clause 89. The electrochemical cell of Clause 88, wherein the cell is wrapped in a microporous material.

Clause 90. The electrochemical cell of Clause 88 or Clause 89, wherein the anode is selected from aluminum, gallium, indium, thallium and alloys comprising at least one of these.

Clause 91. The electrochemical cell of Clause 90, wherein the anode is aluminum.

Clause 92. The electrochemical cell of Clause 90 or Clause 91, wherein the anode is in the form of a screen.

Clause 93. The electrochemical cell of Clause 92, wherein the anode thickness in the screen is between about 0.1 mm and about 0.3 mm.

Clause 94. The electrochemical cell of any one of Clauses 88-93, wherein the cathode current collector is selected from steel, the graphite allotrope of carbon, carbon impregnated with a metal and carbon foam.

Clause 95. The electrochemical cell of Clause 94, wherein the cathode current collector is carbon foam.

Clause 96. The electrochemical cell of any one of Clauses 88-95, wherein the porous, non-conductive spacer is selected from an organic polymer, surgical tape, fiberglass film, glass wool, wood, paper, cloth, cardboard and nylon.

Clause 97. The electrochemical cell of Clause 96, wherein the spacer is vinyl coated polyester.

Clause 98. The electrochemical cell of any one of Clauses 88-97, wherein the spacer is a screen.

Clause 99. The electrochemical cell of Clause 98, wherein the spacer thickness in the screen is between about 0.1 mm and about 0.8 mm and the spacer is vinyl coated polyester.

Clause 100. The electrochemical cell of Clause 1, wherein the electrochemical cell comprises a single electrolyte solution and is electrically connected to a load, and wherein the cell produces between about 10 Watt-hours/(kg of electrolyte +anode metal) and about 680 Watt-hours/(kg of electrolyte +anode metal).

Clause 101. The electrochemical cell of Clause 1, wherein the electrochemical cell comprises a single electrolyte solution and is electrically connected to a load, and wherein the cell produces between about 10 Watt-hours/kg of electrolyte and about 100 Watt-hours/kg of electrolyte.

Clause 102. An electrochemical cell comprising a single aqueous electrolyte solution in contact with a non-metallic cathode current collector, an oxidant, and a metal solid wherein current travels from the metal solid to the current collector via a load.

Clause 103. The electrochemical cell of Clause 102, wherein the aqueous electrolyte solution is basic and the oxidant is $S_2O_8^{2-}$.

Clause 104. The electrochemical cell of Clause 102, wherein the aqueous electrolyte solution further comprises sodium hydroxide.

Clause 105. The electrochemical cell of any one of Clauses 102-104, wherein the metal solid is selected from aluminum, gallium, indium, thallium and alloys comprising at least one of these.

Clause 106. The electrochemical cell of Clause 105, wherein the method solid is aluminum in foil form.

Clause 107. The electrochemical cell of any one of Clauses 102-106, further comprising a porous stabilizer.

Clause 108. The electrochemical cell of any one of Clauses 102-107, further comprising a metal sulfate and wherein the cathode current collector is carbon foam and the porous stabilizer is glass wool or a borosilicate or both.

Clause 109. The electrochemical cell of Clause 108, wherein the metal sulfate is $Na_2SO_4$.

Clause 110. The electrochemical cell of any one of Clauses 102-109 wherein the pH is greater than 12.

Clause 111. The electrochemical cell of Clause 110, wherein the pH is greater than 13.

Clause 112. The electrochemical cell of Clause 111, wherein the pH is greater than 14.

Clause 113. The electrochemical cell of any one of Clauses 102-112, wherein between about 10 Watt-hours/kg of electrolyte and about 100 Watt-hours/kg of electrolyte is produced.

Clause 114. The electrochemical cell of Clause 113, wherein the power produced per square centimeter of metal solid is between about 600 mW and about 1000 mW.

Clause 115. The electrochemical cell of any one of Clauses 102-114 configured to operate in a flow mode.

Clause 116. A method which comprises providing additional oxidant to the electrochemical cell of any one of Clauses 102-115.

Clause 117. The electrochemical cell of Clause 115, further comprising an inflow stream comprising an aqueous electrolyte solution.

Clause 118. The electrochemical cell of Clause 117, wherein the inflow stream further comprises an oxidant.

Clause 119. The electrochemical cell of Clause 118, wherein the oxidant is sodium peroxydisulfate or a solution comprising peroxydisulfate anion or both.

Clause 120. The electrochemical cell of any one of Clauses 115-119, wherein an aqueous solution outflows from the cell.

Clause 121. The electrochemical cell of Clause 120, wherein the aqueous solution outflowing from the cell comprises a metal sulfate.

Clause 122. The electrochemical cell of Clause 118 or 119, wherein the oxidant is in an aqueous basic solution.

Clause 123. The electrochemical cell of Clause 122, wherein the base is NaOH.

Clause 124. The electrochemical cell of Clause 118 or 119 wherein the oxidant is solid $Na_2S_2O_8$.

Clause 125. The electrochemical cell of any one of Clauses 115-124, wherein between about 10 Watt-hours/kg of electrolyte and about 100 Watt-hours/kg of electrolyte is produced.

Clause 126. The electrochemical cell of Clause 125, wherein between about 40 Watt-hours/kg of electrolyte and 80 Watt-hours/kg of electrolyte is produced.

Clause 127. A method of creating a capacitor comprising the steps of disconnecting the load from one side of the electrochemical cell of any one of Clauses Clause 128. The method of Clause 127, further comprising the step of reconnecting the load.

Clause 129. A capacitor, prepared by the process of alternatively disconnecting and reconnecting the load from at least one of the cathode current collector or anode in the cell of any one of Clauses 102-126.

Clause 130. The electrochemical cell of Clause 125, wherein between about 10 Watt-hours/kg of electrolyte and about 60 Watt-hours/kg of electrolyte is produced.

Clause 131. An electrochemical cell comprising a single aqueous electrolyte solution in contact with a non-metallic cathode current collector, an oxidant, and a metal solid wherein current travels from the metal solid to the cathode current collector via a load, and wherein the pH is greater or equal to 12.

Clause 132. The electrochemical cell of Clause 131, wherein the non-metallic cathode current collector is carbon foam, the oxidant is a peroxydisulfate salt, and the metal solid is aluminum.

Clause 133. An electrochemical cell comprising a single aqueous electrolyte solution in contact with a non-metallic cathode current collector, an oxidant, and one or more anodes wherein current travels from the one or more anodes to the cathode current collector via a load, and wherein the pH is greater or equal to 10.

Clause 134. The electrochemical cell of Clause 133, wherein the one or more anodes are a metal.

Clause 135. The electrochemical cell of Clause 134, wherein the metal is aluminum, gallium, indium, thallium, or an alloy comprising at least one of these.

Clause 136. The electrochemical cell of any one of Clause 133-135, wherein the anodes are separated by an insulator.

Clause 137. The electrochemical cell of Clause 135, wherein the anode is aluminum and is in a foil form.

Clause 138. The electrochemical cell of any one of Clauses 133-137, wherein the pH is 12 or greater.

Clause 139. An electrochemical cell comprising:
  a. a cathode;
  b. an anode adjacent to the cathode at a distance;
  c. a first polar electrolyte solution in contact with the cathode and disposed within the distance comprising an oxidant;
  d. a second polar electrolyte solution in contact with the anode and disposed within the distance comprising a suitable metal ion; and
  e. a separation agent;
wherein the first and second electrolyte solutions are in contact with each other and are immiscible, and wherein there is no membrane in between the first and second electrolyte solutions.

Clause 140. The electrochemical cell of Clause 139, wherein each polar electrolyte solution further comprising a porous stabilizer.

Clause 141. The electrochemical cell of any one of Clauses 139-140, configured for flow-mode.

Clause 142. The electrochemical cell of any one of Clauses 139-141, wherein the first polar electrolyte solution is aqueous.

Clause 143. The electrochemical cell of any one of Clauses 139-142, wherein the oxidant is a Vanadium ion.

Clause 144. The electrochemical cell of any one of Clauses 139-142, wherein the oxidant is $S_2O_8^{2-}$.

Clause 145. The electrochemical cell of any one of Clauses 139-142, wherein the oxidant is $ClO^-$.

Clause 146. The electrochemical cell of any one of Clauses 139-145, wherein the first polar electrolyte solution further comprises a base.

Clause 147. The electrochemical cell of Clause 146, wherein the base is selected from KOH, NaOH, Ca(OH)$_2$, LiOH, RbOH, CsOH, Sr(OH)$_2$, and Ba(OH)$_2$.

Clause 148. The electrochemical cell of Clause 147, wherein the base is NaOH.

Clause 149. The electrochemical cell of any one of Clauses 146-148, wherein the pH of the first polar electrolyte solution is between about 8 and about 14.

Clause 150. The electrochemical cell of Clause 149, wherein the pH of the first polar electrolyte solution is between about 11 and about 14.

Clause 151. The electrochemical cell of any one of Clauses 140-150, wherein the porous stabilizer is borosilicate.

Clause 152. The electrochemical cell of any one of Clauses 139-151, wherein the separation agent is a salt.

Clause 153. The electrochemical cell of Clause 152, wherein the salt is calcium chloride.

Clause 154. The electrochemical cell of Clause 152, wherein the salt is sodium sulfate.

Clause 155. The electrochemical cell of any one of Clauses 139-154, wherein the cell is configured to operate in a flow mode.

Clause 156. The electrochemical cell of Clause 155, further comprising an inflow solution comprising an aqueous solution comprising a base, an oxidant, and a separation agent.

Clause 157. The electrochemical cell of Clause 156, wherein the base is sodium hydroxide, the separate agent is sodium sulfate, and the oxidant $S_2O_8^{2-}$.

Clause 158. The electrochemical cell of any one of Clauses 155-157, wherein an aqueous solution comprising base and sodium sulfate outflows from the cell.

Clause 159. The electrochemical cell of any one of Clauses 155-157, further comprising an outflow solution comprising an aqueous solution of a base.

Clause 160. The electrochemical cell of Clause 159, wherein the base is sodium hydroxide.

Clause 161. The electrochemical cell of any one of Clauses 139-160, wherein a current collector is placed within the first electrolyte solution.

Clause 162. The electrochemical cell of Clause 161, wherein the current collector is a metal.

Clause 163. The electrochemical cell of Clause 161, wherein the current collector is a non-metal.

Clause 164. The electrochemical cell of Clause 163, wherein the current collector is carbon foam.

Clause 165. The electrochemical cell of any one of Clauses 139-164, further comprising glass wool placed in between the first and second polar electrolyte solutions.

Clause 166. The electrochemical cell of any one of Clauses 139-165, wherein the second polar electrolyte solution comprises an alcohol.

Clause 167. The electrochemical cell of any one of Clauses 139-166, wherein the suitable metal ion is $Zn^{2+}$.

Clause 168. The electrochemical cell of any one of Clauses 139-166, wherein the suitable metal ion is $Al^{3+}$.

Clause 169. The electrochemical cell of any one of Clauses 139-168, wherein the second polar electrolyte solution is an alcoholic solution and further comprises a base.

Clause 170. The electrochemical cell of Clause 169, wherein the base is KOH.

Clause 171. The electrochemical cell of Clause 169, wherein the base is NaOH.

Clause 172. The electrochemical cell of any one of Clauses 169-171, wherein the pH of the second polar electrolyte solution is between about 8 and about 14.

Clause 173. The electrochemical cell of Clause 172, wherein the pH of the second polar electrolyte solution is between about 11 and about 14.

Clause 174. The electrochemical cell of any one of Clauses 166-173, wherein the separation agent is a salt and the alcohol is ethanol, methanol, or both.

Clause 175. The electrochemical cell of Clause 174, wherein the salt is $CaCl_2$.

Clause 176. The electrochemical cell of Clause 174, wherein the salt is sodium sulfate.

Clause 177. The electrochemical cell of any one of Clauses 166-176, wherein the alcohol is ethanol.

Clause 178. The electrochemical cell of any one of Clauses 139-177, wherein a current collector is placed within the second electrolyte solution.

Clause 179. The electrochemical cell of Clause 178, wherein the current collector is a metal.

Clause 180. The electrochemical cell of Clause 178, wherein the current collector is a non-metal.

Clause 181. The electrochemical cell of Clause 180, wherein the current collector is carbon foam.

Clause 182. The electrochemical cell of any one of Clauses 166-181, wherein the cell is configured to operate in a flow mode.

Clause 183. The electrochemical cell of Clause 182, further comprising an inflow stream comprising a polar solution comprising an alcohol, a base, a separation agent, and a metal capable of dissociating into a suitable metal ion.

Clause 184. The electrochemical cell of Clause 183, wherein the alcohol is ethanol or methanol or both, the base is sodium hydroxide, and the suitable metal ion is $Al^{3+}$.

Clause 185. The electrochemical cell of any one of Clauses 166-184, further comprising an outflow stream comprising an alcohol, a base, and a separation salt.

Clause 186. The electrochemical cell of Clause 185, wherein the separation salt is sodium sulfate, and the base is sodium hydroxide.

Clause 187. The electrochemical cell of Clauses 185 or 186, wherein the alcohol is ethanol.

Clause 188. The electrochemical cell of any one of Clauses 139-187, wherein hydrogen gas is generated in the second electrolyte solution.

Clause 189. The electrochemical cell of Clause 188, wherein the hydrogen gas is directed to a hydrogen compressor.

Clause 190. A battery system comprising one or more electrochemical cells of any one of Clauses 139-189 and a hydrogen compressor.

Clause 191. The battery system of Clause 190 wherein the hydrogen is used to power a process application.

Clause 192. The battery system of Clause 191, wherein the process application is a fuel cell.

Clause 193. An electrochemical cell comprising:
a. a cathode;
b. an anode adjacent the cathode at a distance;
c. a first polar aqueous electrolyte solution in contact with the cathode and disposed within the distance comprising $S_2O_8^{2-}$;
d. a second polar electrolyte alcoholic solution in contact with the anode and disposed within the distance comprising $Al^{3+}$; and
e. borosilicate within both the first and second electrolyte solutions;

wherein the first and second electrolyte solutions are in contact with each other and are immiscible, and wherein there is no membrane in between the first and second electrolyte solutions.

Clause 194. The electrochemical cell of Clause 193, wherein the first polar electrolyte solution and second polar electrolyte solution are of different densities and wherein the first electrolyte solution further comprises a halide salt and the second electrolyte solution further comprises a metal sulfate salt.

Clause 195. The electrochemical cell of Clause 194, wherein the alcohol is methanol or ethanol, the halide salt is $CaCl_2$ and the metal sulfate salt is $Na_2SO_4$.

Clause 196. The electrochemical cell of Clause 195, wherein the pH of the first electrolyte and second electrolyte solutions are adjusted to between about 11 to about 13 each.

Clause 197. The electrochemical solution of Clause 193, wherein the first and second electrolyte solutions further comprise a base.

Clause 198. The electrochemical solution of Clause 197, wherein the base is sodium, calcium or potassium hydroxide.

Clause 199. The electrochemical cell of any one of Clauses 193-198, wherein the cathode is copper, carbon, or both and the anode is aluminum.

Clause 200. The electrochemical cell of Clause 199, wherein the cathode is a copper brush.

Clause 201. The electrochemical cell of any one of Clauses 193-200, wherein the borosilicate is Pyrex® wool.

Clause 202. The electrochemical cell of any one of Clauses 193-201 wherein the cell is configured to run in a flow mode.

Clause 203. An electrochemical battery comprising one or more electrochemical cells of any one of Clauses 193-202.

Clause 204. The electrochemical battery of Clause 203, wherein the number of electrochemical cells is greater than one and the electrochemical cells are arranged in a parallel geometry.

Clause 205. The electrochemical battery of Clause 204, wherein the cells are arranged in a voltaic pile.

Clause 206. The electrochemical battery of any one of Clauses 203-205, wherein the battery delivers electricity to a process application.

Clause 207. The electrochemical battery of Clause 206, wherein the process application is selected from solar farms, wind farms, household appliances, consumer goods, and toys.

Clause 208. A method of delivering electricity from an electrochemical cell of any one of Clauses 193-202 to a process application.

Clause 209. The method of Clause 208, wherein the process application is selected from solar farms, wind farms, household appliances, consumer products, and toys.

Clause 210. The electrochemical cell of Clause 201, wherein the borosilicate has a pore size of about 8 microns.

Clause 211. An electrochemical cell comprising:
a. a non-metallic cathode;
b. a non-metallic anode adjacent the cathode at a distance;
c. a first polar aqueous electrolyte solution in contact with the cathode and disposed within the distance comprising $S_2O_8^{2-}$; and
d. a second polar electrolyte alcoholic solution in contact with the anode and disposed within the distance comprising a metal solid;

wherein the first and second electrolyte solutions are in contact with each other and are immiscible, and wherein there is no membrane in between the first and second electrolyte solutions.

Clause 212. The electrochemical cell of Clause 211, wherein the metal solid is dispersed through the solution in powder form and wherein borosilicate is placed within both the first and second electrolyte solutions.

Clause 213. The electrochemical cell of Clause 212, wherein the metal is zinc.

Clause 214. The electrochemical cell of Clause 212, wherein the metal is aluminum.

Clause 215. The electrochemical cell of any one of Clauses 211-214, wherein the non-metallic cathode is carbon foam.

Clause 216. The electrochemical cell of any one of Clauses 211-215, wherein the non-metallic anode is carbon foam.

Clause 217. The electrochemical cell of any one of Clauses 212-216 wherein the average particle size of the powder is less than about 5 microns.

Clause 218. The electrochemical cell of any one of Clauses 212-216, wherein the average particle size of the powder is between about 5 and about 30 microns.

Clause 219. A method of boosting current in an electrochemical cell comprising the steps of adding oxidant to the second electrolyte solution of any one of Clauses 211-218.

Clause 220. An electrochemical cell comprising:
a. a cathode;
b. an anode adjacent to the cathode at a distance;
c. a first aqueous electrolyte solution in contact with the cathode and disposed within the distance comprising an oxidant;
d. a second polar electrolyte solution in contact with the anode and disposed within the distance comprising a metal and an oxidant; and
e. a separation agent;
wherein the first and second electrolyte solutions are in contact with each other and are immiscible, and wherein there is no membrane in between the first and second solutions.

Clause 221. The electrochemical cell of Clause 220, wherein the second polar electrolyte solution is an alcoholic solution.

Clause 222. The electrochemical cell of Clause 221, wherein the alcohol is ethanol or methanol.

Clause 223. The electrochemical cell of any one of Clauses 220-222, wherein the oxidant is $S_2O_8^{2-}$ or sodium peroxydisulfate, or both, the metal is aluminum, the separation agent is sodium sulfate, and the cathode and anode are carbon foam.

Clause 224. The electrochemical cell of Clause 223, wherein a porous stabilizer is in the first and second electrolyte solutions.

Clause 225. The electrochemical cell of Clause 224, wherein the porous stabilizer is glass wool, a borosilicate, or both.

Clause 226. The electrochemical cell of any one of Clauses 220-225, configured to operate in a flow mode.

Clause 227. A method which comprises providing additional oxidant to the electrochemical cell of any one of Clauses 220-226.

Clause 228. The electrochemical cell of Clause 226 or 227, further comprising an inflow stream comprising an aqueous electrolyte solution.

Clause 229. The electrochemical cell of Clause 228, wherein the inflow stream further comprises an oxidant.

Clause 230. The electrochemical cell of Clause 229, wherein the oxidant is sodium peroxydisulfate or a solution comprising peroxydisulfate anion or both.

Clause 231. The electrochemical cell of any one of Clauses 226 and 228-230, wherein an aqueous solution outflows from the cell.

Clause 232. A method which comprises removing metal sulfate from the electrochemical cell of any one of Clauses 226 and 228-230.

Clause 233. The electrochemical cell of Clause 229, wherein the oxidant is in an aqueous basic solution.

Clause 234. The electrochemical cell of Clause 233, wherein the base is NaOH.

Clause 235. The electrochemical cell of Clause 229 or 230 wherein the oxidant is solid $Na_2S_2O_8$.

Clause 236. The electrochemical cell of any one of Clauses 220-235, which produces between about 10 Watt-hours/kg of electrolyte and about 100 Watt-hours/kg of electrolyte.

Clause 237. The electrochemical cell of Clause 208, wherein between about 40 Watt-hours/kg of electrolyte and about 80 Watt-hours/kg of electrolyte is produced.

Clause 238. A vehicle comprising one or more electrochemical cells of clauses 1-25, 40-56, 72-79, 88-115, 117-126, or 130-138.

Clause 239. A vehicle comprising one or more batteries of clauses 26, 57-67, or 80-87.

Clause 240. The vehicle of clause 238, wherein the vehicle is selected from scooters, motorized grocery cars, battery backups, forklifts, trucks, passenger cars, lift trucks, motorcycles, fork trucks, planes, boats, quads, and tractors.

Clause 241. The vehicle of clause 239, wherein the vehicle is selected from scooters, motorized grocery cars, battery backups and other stationary applications, forklifts, trucks, passenger cars, vehicular range extenders, battery chargers, lift trucks, motorcycles, fork trucks, planes, boats, quads, and tractors.

What is claimed is:

1. An electrochemical cell, which comprises:
   a. an anode selected from aluminum, gallium, indium, thallium and alloys comprising at least one of these;
   b. a cathode current collector; and
   c. a porous, non-conductive spacer between the cathode current collector and anode, further comprising a single electrolyte solution in contact with both the anode and cathode current collector, wherein the electrolyte solution is a catholyte comprising an oxidant, wherein the oxidant is sodium peroxydisulfate, and wherein the electrolyte solution further comprises a base and has a pH of greater than 12; and
   wherein the electrochemical cell is configured as a flow cell.

2. The electrochemical cell of claim 1, wherein the anode is aluminum or an alloy comprising aluminum.

3. The electrochemical cell of claim 1, wherein the cathode current collector is selected from steel, the graphite allotrope of carbon, carbon impregnated with a metal and carbon foam.

4. The electrochemical cell of claim 1, wherein the porous, non-conductive spacer is selected from an organic polymer, fiberglass film, glass wool, wood, paper, cloth, cardboard and nylon.

5. The electrochemical cell of claim 1, wherein the electrolyte solution comprises water as a solvent.

6. The electrochemical cell of claim 1, wherein the electrolyte solution further comprises a metal salt in addition to the sodium peroxydisulfate oxidant.

7. The electrochemical cell of claim 6, wherein the oxidant and metal salt have different anion components.

8. The electrochemical cell of claim 7, wherein the metal salt is sodium sulfate.

9. The electrochemical cell of claim 1, wherein the base is sodium hydroxide.

10. The electrochemical cell of claim 1, wherein the electrolyte solution comprises water, the oxidant, a metal salt and the base.

11. The electrochemical cell of claim 10, wherein the electrolyte solution comprises water as a solvent, sodium sulfate as a metal salt, and sodium hydroxide as a base.

12. The electrochemical cell of claim 1, wherein the electrolyte solution does not comprise sodium chloride.

13. The electrochemical cell of claim 1, wherein the electrolyte solution has pH of greater than 14.

14. A method of generating electricity, which comprises connecting an electrochemical cell of claim 1 to a load.

15. A method of generating hydrogen, which comprises making the cell of claim 1 and producing the hydrogen upon contacting both the anode and cathode current collector of the cell with the single electrolyte solution.

16. The method of claim 15, which further comprises delivering the hydrogen to a fuel cell.

17. The method of claim 15, which further comprises delivering the hydrogen to an engine for burning.

18. A method of operating an electrochemical cell of claim 1 as a flow cell, which comprises:
   operating the electrochemical cell to generate electricity, hydrogen, or both electricity and hydrogen; and
   providing additional electrolyte solution, or one or more components thereof, to the electrochemical cell during its operation; and
   withdrawing spent electrolyte solution, or one or more components thereof, from the electrochemical cell during its operation.

* * * * *